US011677623B2

(12) United States Patent
Celichowski et al.

(10) Patent No.: US 11,677,623 B2
(45) Date of Patent: Jun. 13, 2023

(54) SYSTEM FOR MANAGING ADOPTION LIFECYCLE OF NETWORKING AND COMPUTING EQUIPMENT

(71) Applicant: Cisco Technology, Inc., San Jose, CA (US)

(72) Inventors: Nicole Marie Celichowski, Saint Paul, MN (US); Daniel Garrison, San Jose, CA (US); Ramit Kanda, Danville, CA (US); Brian Richard Sarbin, Waynesboro, VA (US); Pat Tittiranonda, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/410,551

(22) Filed: Aug. 24, 2021

(65) Prior Publication Data
US 2022/0200855 A1    Jun. 23, 2022

Related U.S. Application Data

(60) Provisional application No. 63/128,463, filed on Dec. 21, 2020.

(51) Int. Cl.
*H04L 12/24*       (2006.01)
*H04L 41/0816*   (2022.01)
(Continued)

(52) U.S. Cl.
CPC ..... *H04L 41/0816* (2013.01); *G06Q 10/0639* (2013.01); *H04L 41/0886* (2013.01);
(Continued)

(58) Field of Classification Search
CPC . H04L 41/0816; H04L 41/14; H04L 41/0886; H04L 47/762; H04L 47/781;
(Continued)

(56) References Cited

U.S. PATENT DOCUMENTS

2010/0235738 A1   9/2010  Kodha et al.
2013/0006408 A1   1/2013  Zakrzwski et al.
(Continued)

OTHER PUBLICATIONS

Marley Wagner, The 5 Stages Of The Customer Lifecycle, Feb. 12, 2020, URL retrieved via: https://esgsuccess.com/5-stages-of-the-customer-success-lifecycle/ (Year: 2020).*
(Continued)

*Primary Examiner* — Schquita D Goodwin
(74) *Attorney, Agent, or Firm* — Edell, Shapiro & Finnan, LLC

(57) ABSTRACT

Methods are provided in which a computing device obtains telemetry data associated with a network technology used in an enterprise network. The network technology is deployed using one or more assets of the enterprise. The methods further include the computing device determining, for each deployment of the network technology, a progression along an adoption lifecycle of the network technology, based on the telemetry data, generating, based on the progression of each deployment of the network technology, a first action set and an alternative second action set, different from the first action set, for further progression along the adoption lifecycle and providing the first action set and the alternative second action set for the further progression of the network technology along the adoption lifecycle.

20 Claims, 16 Drawing Sheets

(51) Int. Cl.
*H04L 41/14* (2022.01)
*G06Q 10/0639* (2023.01)
*H04L 41/08* (2022.01)
*H04L 47/762* (2022.01)
*H04L 47/78* (2022.01)
*H04L 47/70* (2022.01)

(52) U.S. Cl.
CPC ............ *H04L 41/14* (2013.01); *H04L 47/762* (2013.01); *H04L 47/781* (2013.01); *H04L 47/827* (2013.01)

(58) Field of Classification Search
CPC .. H04L 47/827; G06Q 30/01; G06Q 30/0202; G06Q 10/06393; G06Q 10/0639
See application file for complete search history.

(56) References Cited

U.S. PATENT DOCUMENTS

| | | |
|---|---|---|
| 2015/0019700 A1 | 1/2015 | Masterson et al. |
| 2016/0189082 A1* | 6/2016 | Garrish ............ G06Q 10/06393 705/7.39 |
| 2016/0253046 A1 | 9/2016 | Garrison et al. |
| 2016/0253078 A1 | 9/2016 | Ebtekar et al. |
| 2016/0254968 A1 | 9/2016 | Ebtekar et al. |
| 2016/0307219 A1* | 10/2016 | Hsu .................... G06Q 30/0202 |
| 2017/0364561 A1 | 12/2017 | Wu et al. |
| 2019/0147412 A1* | 5/2019 | Chiaramonte ......... G06Q 10/20 705/7.13 |
| 2019/0188737 A1 | 6/2019 | Asenjo et al. |
| 2019/0212901 A1 | 7/2019 | Garrison et al. |
| 2019/0265971 A1 | 8/2019 | Behzadi et al. |
| 2019/0266762 A1 | 8/2019 | Ebtekar et al. |
| 2019/0294477 A1* | 9/2019 | Koppes .................. G06F 9/5072 |
| 2019/0361720 A1 | 11/2019 | Balachandran |
| 2020/0193311 A1* | 6/2020 | Myers ..................... G06N 5/045 |
| 2021/0019133 A1* | 1/2021 | Rusev ..................... H04L 41/20 |
| 2021/0081189 A1 | 3/2021 | Nucci et al. |
| 2021/0089987 A1 | 3/2021 | Mayer et al. |
| 2021/0120023 A1* | 4/2021 | Gupta ................. H04L 63/1425 |
| 2021/0224124 A1* | 7/2021 | Barsalou ................. H04L 67/34 |
| 2021/0295346 A1 | 9/2021 | Venkataraman et al. |
| 2021/0406729 A1* | 12/2021 | Arias ...................... G06N 5/022 |
| 2022/0148021 A1* | 5/2022 | Wilson ................... G06Q 30/06 |

OTHER PUBLICATIONS

Capterra, Inc. "Customer Experience Software", https://www.capterra.com/sem-compare/customer-experience-software/, downloaded from Internet Jun. 24, 2021, 3 pages.
G2, "Oracle Customer Experience (CX) Cloud Site", Sales Platforms, downloaded from Internet Jun. 24, 2021, 22 pages.
Salesforce, "From Lead to Loyal: Creating Engagement through Effective Customer Lifecycle Management", https://www.salesforce.com/products/marketing-cloud/best-practices/customer-lifecycle-management/, downloaded Aug. 5, 2021, 6 pages.
McKinset & Company, "Customer Lifecycle Management", How we Help Clients, https://www.mckinsey.com/business-functions/marketing-and-sales/how-we-help-clients/customer-lifecycle-management#, downloaded Aug. 5, 2021, 8 pages.
Gainsight, "Customer Lifecycle Management", https://www.gainsight.com/your-success/customer-lifecycle-management/, downloaded Aug. 5, 2021, 2 pages.

* cited by examiner

SYSTEM FOR MANAGING ADOPTION LIFECYCLE OF NETWORKING AND COMPUTING EQUIPMENT

CROSS-REFERENCE TO RELATED APPLICATION

This application claims the benefit of priority under 35 U.S.C. § 119(e) to U.S. Provisional Patent Application No. 63/128,463, entitled "CUSTOMER SERVICE CLOUD PORTAL SYSTEM," filed on Dec. 21, 2020, which is hereby incorporated by reference in its entirety.

TECHNICAL FIELD

The present disclosure relates to computer networks and systems.

BACKGROUND

Enterprise service functions for equipment and software can be burdensome and inefficient. This is particularly the case for enterprises that have large networks or systems of numerous instances and types of equipment and software. Tracking performance, troubleshooting, and integrating new technology and/or updates for networking or equipment and software in large networks is time consuming and often requires support and guidance from providers or third party entities.

DESCRIPTION OF EXAMPLE EMBODIMENTS

Overview

Briefly, methods are presented for cross-domain aggregation of network technologies used in an enterprise, along with their respective progression in an adoption lifecycle and providing guidance for advancing the respective technology along the adoption lifecycle.

In one example, a method is provided that includes obtaining telemetry data associated with a network technology used in an enterprise network. The network technology is deployed using one or more assets of the enterprise. The method further involves determining, for each deployment of the network technology, a progression along an adoption lifecycle of the network technology, based on the telemetry data. The method then includes generating, based on the progression of each deployment of the network technology, a first action set and an alternative second action set, different from the first action set, for further progression along the adoption lifecycle and providing the first action set and the alternative second action set for the further progression of the network technology along the adoption lifecycle.

Example Embodiments

Figure 1:
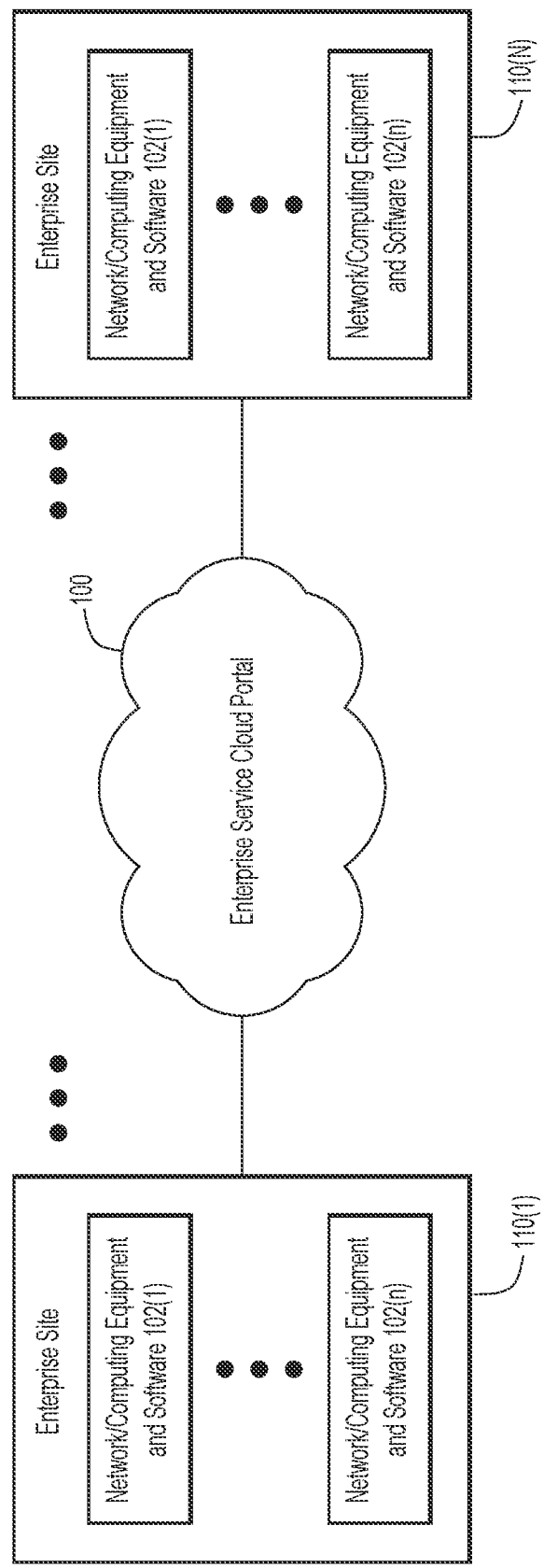
FIG. 1 is a block diagram of a system that includes an enterprise service cloud portal that interacts with network/computing equipment and software residing at various enterprise sites, according to an example embodiment.

FIG. 1 is a block diagram of a system 10 that includes an enterprise service cloud portal (cloud portal) 100 that interacts with network/computing equipment and software 102(1)-102(N) residing at various enterprise sites 110(1)-110(N), or in cloud deployments of an enterprise, according to an example embodiment.

The notations 1, 2, 3, . . . n and a, b, c, . . . n illustrate that the number of elements can vary depending on a particular implementation and is not limited to the number of elements being depicted or described.

The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (PoD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, and so on. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

A network technology is a computing-based service or a solution that solves an enterprise network or a computing problem or addresses a particular enterprise computing need. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VoIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software 102(1)-102(N).

For an enterprise-grade technology solution, the deployment process may be complex and confusing. While product guides and documentation may be available, it is difficult to know what is available and then discern what is relevant to the IT environment and the goal of the enterprise. Further, it is difficult to track the deployment process. To ease the deployment process and accelerate the speed to value of a network technology, the techniques presented herein track progress of deployments and use of enterprise network technologies using telemetry data and generate guidance such as action plans and support resources, that is specifically tailored to the enterprise network technology and its progression along the adoption lifecycle. Techniques described herein focus on the enterprise's journey to a desired end-state with its network technologies.

An adoption refers to enterprise's uptake and utilization of a network technology for achieving a desired outcome. A journey refers to end-to-end activities performed by an enterprise when adopting a network technology including tasks they perform and defined stages to progress. According to one or more example embodiment, an adoption lifecycle refers to a step-by-step guidance along the adoption journey to accelerate the speed to value of a network technology. In one example embodiment, the adoption lifecycle is focused on the post-purchase stages of onboard to implement, to use and engage, to adopt and maximize value of the network technology. The adoption lifecycle may encompass the end-to-end journey stages of: need, evaluate, select, align, purchase, onboard, implement, use, engage, adopt, optimize, recommend, advocate, and accelerate. Leveraging a hybrid combination of explicitly provided human input (either from an enterprise or a service provider) and implicitly derived network telemetry, the adoption lifecycle tracks and visualizes what stage(s) the network technology is at with its deployment(s), provides the next activities needed to make progress toward a desired outcome (use cases), and contextualizes a combination of support resources (freely available content such as product guides and online community threads and premium content/resources such as topic-based webinars and one on one coaching sessions), which is tagged and associated with the corresponding journey stages and activities being undertaken by the enterprise.

In an example embodiment, the cloud portal 100 determines outcomes based on analyzing the telemetry data and the progression along the adoption lifecycle and classifies each outcome into a respective category such as an adoption time category, a performance related category, a troubleshooting related category, a support case category, etc. Various action sets are then generated for various outcomes. The cloud portal 100 may be executed by one or more computing devices such as servers.

Figure 2:
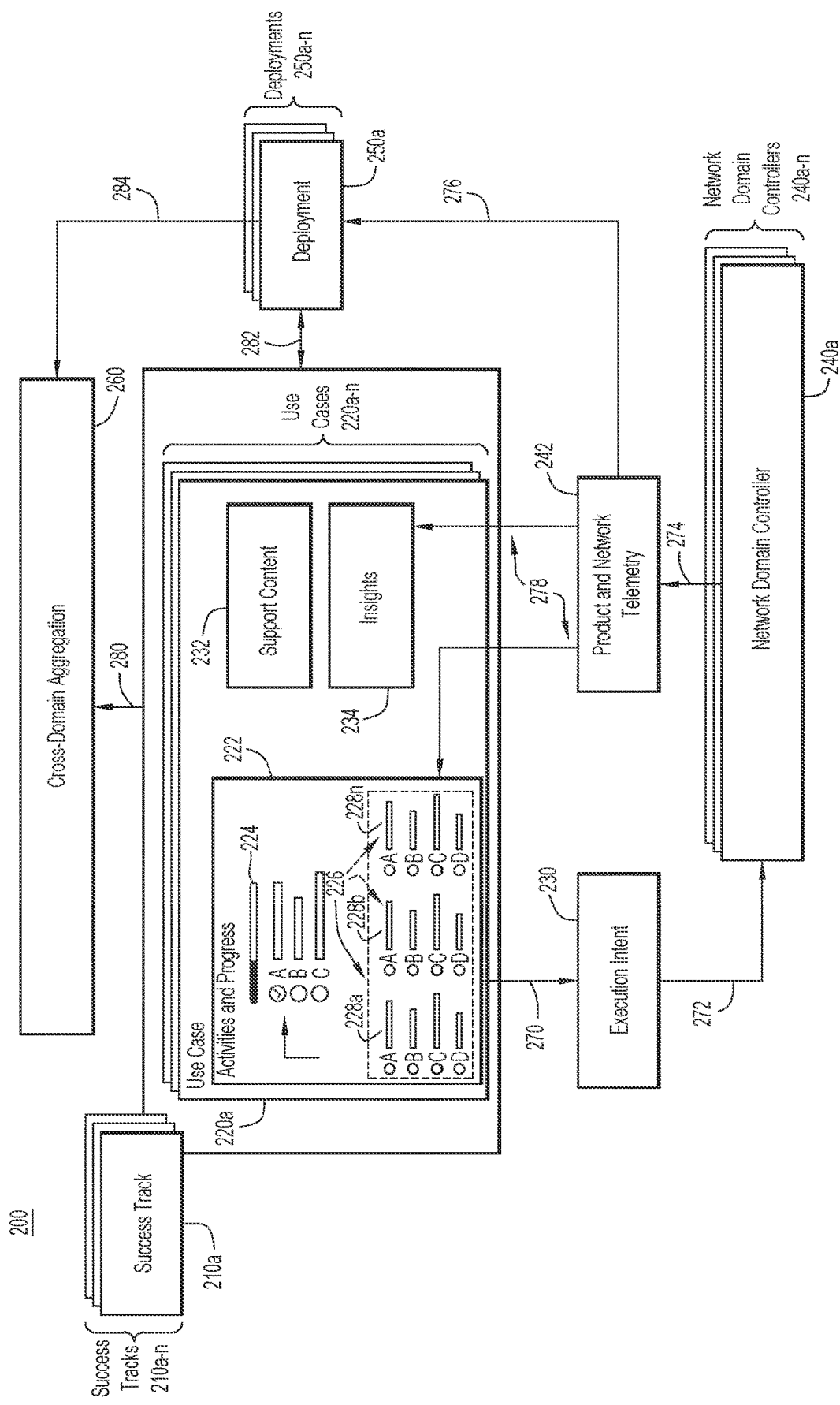
FIG. 2 is a high-level architecture diagram illustrating a feedback loop for progressing various enterprise network technologies along an adoption lifecycle, according to an example embodiment.

FIG. 2 is a high-level diagram illustrating a feedback loop 200 for progressing along an adoption lifecycle of various enterprise network technologies, according to an example embodiment. Reference is also made to FIG. 1 for purposes of the description of FIG. 2. The feedback loop 200 includes success tracks 210*a-n*, uses cases 220*a-n*, network domain controllers 240*a-n*, deployments 250*a-n*, and a cross-domain aggregation 260.

The success tracks 210*a-n* are examples of various enterprise network domains or various enterprise network technologies or enterprise technology solutions such as, but not limited to, a campus network, a data center, a software defined network (SDN) at a location A, a security domain, a collaboration domain, integrated secure operations, etc.

Each success track such as the depicted success track 210*a* includes one or more use cases 220*a-n*. The use cases 220*a-n* are outcomes that an enterprise is trying to achieve with a particular network technology. Non-limiting examples of use cases 220a-n are network access policies, network device onboarding, network segmentation, network provisioning, endpoint protection, etc.

Each use case such as the use case 220a has a digital representation or a contextualization 222 of progression 224 in an adoption lifecycle and actions 226 needed to further progress along the adoption lifecycle, as detailed below.

The progression 224 may indicate the current stage or phase in the adoption lifecycle with 100% indicating that the enterprise's intended outcome is achieved such as the utilization value of the network technology is maximized.

The actions 226 may be provided in a form of a branched output that includes multiple action sets 228a-n such as a first action set 228a that includes tasks B, C, and D, an alternative second action set 228b that includes tasks B, E, and C, and an alternative third action set 228n that includes tasks F, B, and C. The tasks are performed by affected assets of the enterprise such as some of the network/computing equipment and software 102(1)-102(N). In one example, a task is an action that changes a configuration of the affected assets or the affected network/computing equipment and software 102(1)-102(N). Specifically, an action set may include the task in a form of an actionable triggers that generates an execution intent 230 to control one or more of the network domain controllers 240a-n (such as a first network domain controller 240a) to initiate a change in the configuration of one or more of the network/computing equipment and software 102(1)-102(N). The change in the configuration may include installing a new, upgraded, or different version of the software, connecting the hardware device such as a switch or a router to a network, etc. Based on implementing the task A, new or updated action sets are generated such as the action sets 228a-n.

The use case 220a further includes support resources such as support content 232 and insights 234. The support resources are mapped to the progression 224 and are provided to help advance the progression 224 along the adoption lifecycle, as detailed below.

The network domain controllers 240a-n generate the product and network telemetry data 242 related to tracking progression of the network technology along the adoption lifecycle. Additionally, the network domain controllers 240a-n are configured to execute configuration changes of the network/computing equipment and software 102(1)-102(N) based on the execution intent 230.

The deployments 250a-n are underlying sets of networking environment that has been instantiated in the enterprise network. The deployments 250a-n involve various network/computing equipment and software 102(1)-102(N) at the enterprise sites 110(1)-110(N).

The cross-domain aggregation 260 is a cross-domain digital representation of the enterprise network technologies along with their respective progressions in the adoption lifecycle for the use cases 220a-n and/or the deployments 250a-n.

The feedback loop 200 provides a closed loop mechanism for various enterprise network technologies (the success tracks 210a-n) to progress along the adoption lifecycle using the action sets 228a-n. The action sets 228a-n are extended from a representation of the enterprise past/current/future tasks and progress along their adoption lifecycles. Some or all of the tasks in the action sets 228a-n may be augmented to incorporate an actionable trigger, as described above. The feedback loop 200 involves, at 270, an actionable trigger A of the first action set 228a is selected. At 272, the execution intent 230 of the action trigger A is generated and provided to the affected assets of the network domain controllers 240a-n, which respectively initiate an action within the underlying affected controllers. In this way, the context and intent passes into the corresponding systems of change. Specifically, a configuration of one or more of the network/computing equipment and software 102(1)-102(N) at the enterprise sites 110(1) and 110(N) is changed.

From that point, the automated and/or manual workflows of the underlying domain controller(s) take over, using the processes already established within those systems and with user input if required. As the underlying activities are completed in the underlying domain controller(s), at 274, the product and network telemetry 242 is generated and at 276, the product and network telemetry is fed back into the deployments 250a-n and at 278, into the use cases 220a-n. The product and network telemetry 242 is used to (1) update journey progression such as the progression 224, (2) to dynamically update the action sets 228a-n (presented list of activities with task A indicated as completed), and (3) updated support resources (the support content 232 and the insights 234) that apply to the updated action sets 228a-n, thereby maximizing the desired outcomes and/or improving ways in which an enterprise performs the action.

The product and network telemetry 242 serves as input that is modeled by the cloud portal 100 to provide the insights 234 (information about what was changed, how it was changed, and the consequences of those changes). The cloud portal 100 further classifies the consequences into respective categories such as opening a support case, slower than average adoption time, crashes, performance issue, etc. and generates the branched output that includes the action sets 228a-n that have automated and/or manual modules (tasks) specific to each class of consequences.

At 280, the success tracks 210a-n are aggregated and contextualized into the cross-domain aggregation 260, described with reference to FIGS. 5A and 5B. The deployments 250a-n may also be aggregated and contextualized into the cross-domain aggregation 260. For example, at 282, the use case 220a is selected that is deployed in two or more of the deployments 250a-n. At 284, these two or more deployments that deploy the use case 220a are aggregated. In another example, the deployment 250a may be provided with various use cases 220a-n of various success tracks 210a-n that are deployed therein at the cross-domain aggregation 260.

Figure 3:
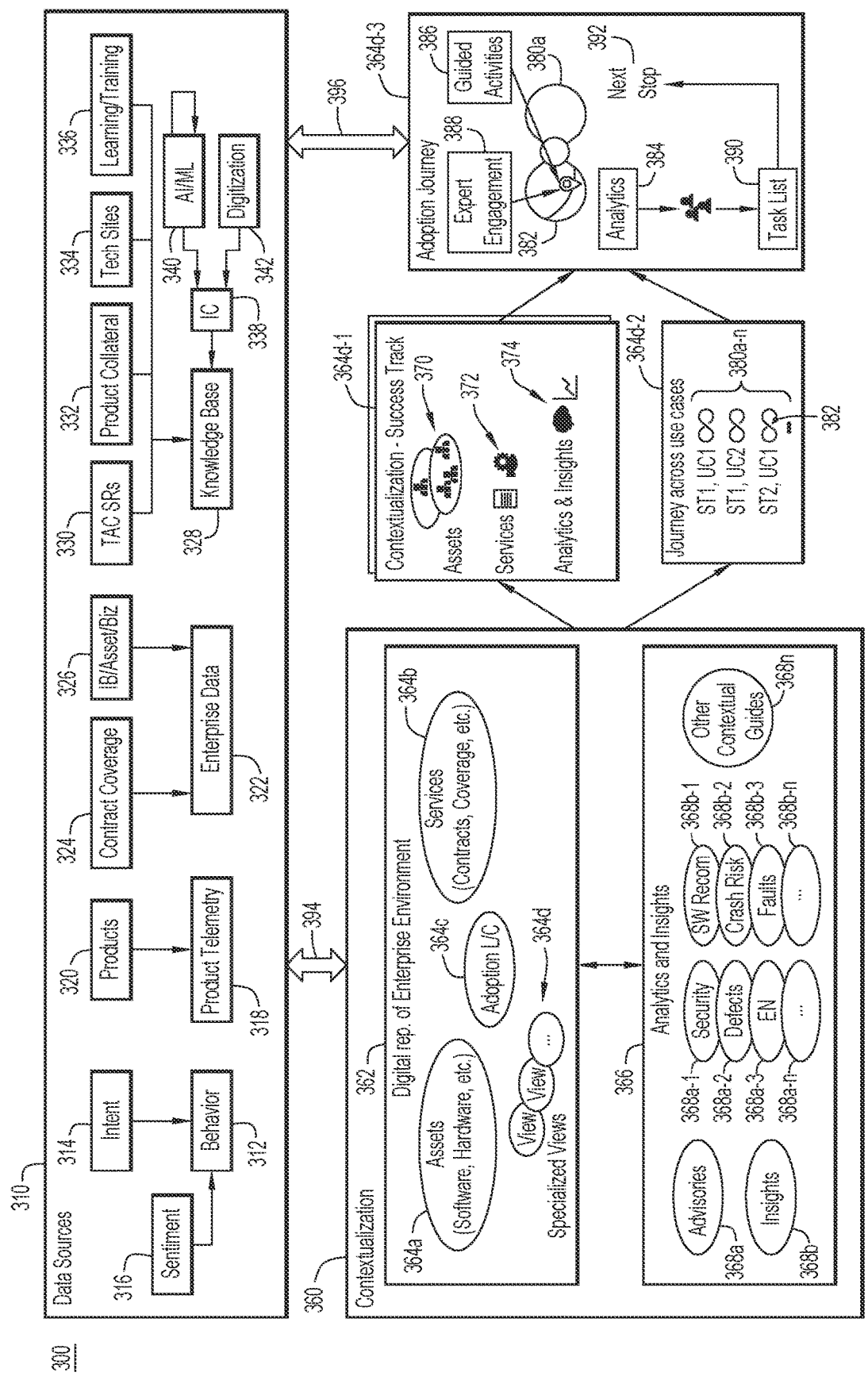
FIG. 3 is a detailed system architecture diagram for managing enterprise resources and progressing network technologies along an adoption lifecycle, according to an example embodiment.

FIG. 3 is a detailed system architecture diagram 300 of the cloud portal 100 in connection with its operations for managing enterprise resources and progressing network technologies along an adoption lifecycle, according to an example embodiment. Reference is also made to FIGS. 1 and 2 for purposes of the description of FIG. 3. The cloud portal 100 obtains inventory data and supporting content from data sources 310 to form a contextualization 360 that involves progression along the adoption lifecycle of the network technologies.

The data sources 310 include an enterprise behavior 312 generated based on an enterprise's intent 314 and sentiment 316. The enterprise behavior 312 represents patterns of use and enterprise for its network/computing equipment and software 102(1)-102(N), at various enterprise sites 110(1)-110(N) such as implement latest technology or maintain current version for as long as possible.

The data sources 310 further include product telemetry 318 obtained by monitoring products 320, such as the network/computing equipment and software 102(1)-102(N) of the enterprise. The product telemetry 318 may include operational states, updates and configuration related data, faults, errors, etc.

The data sources 310 further include enterprise data 322 obtained from enterprise contracts 324, such as purchase contracts, service contracts, and warranty service agreements, and asset information 326 that may include data about network/computing equipment and software 102(1)-102(N), at various enterprise sites 110(1)-110(N). The enterprise behavior 312, the product telemetry 318 and enterprise data 322 are another example of the product and network telemetry 242 of FIG. 2.

The data sources 310 further include a knowledge base 328. The knowledge base 328 includes contextual information (support material or resources) from a technical assistance center (TAC) service requests (SRs) 330, product collateral 332, such as instruction manuals and user manuals, technical sites 334, learning and training materials 336, and intellectual capital (IC) 338 generated based on artificial intelligence (AI)/machine learning (ML) 340 and digitization 342 associated with product cases/issues. The IC 338 provides for integrated insights and analytics on one or more assets/resources across dimensions such as health/risk, stability, capacity, and aging.

The contextualization 360 involves generating digital representations 362 of the enterprise environment and providing analytics and insights 366 specific to the enterprise. Some examples of the digital representations 362 include a unified view of the enterprise assets 364a, services 364b, adoption life cycle (L/C) 364c, specialized views 364d, etc. The specialized views 364d represent distinct dimensions of the context, such as a success track contextualization 364d-1, an aggregate representation of the L/C journey across all of the domains (aggregate representation) 364d-2, an adoption journey contextualization 364d-3, deployments, assets and coverage inventory and install base information, unified and normalized across the domains. A backend platform and data lake system may aggregate disparate sources of information to present these unified views relevant to the enterprise environment.

Some examples of the analytics and insights 366 include advisories 368a, insights 368b, and other contextual guides 368n. The advisories 368a may be subdivided into categories such as security advisories 368a-1, defects 368a-2, field notices (FN) 368a-3, and others 368a-n. The insights 368b may also subdivided into categories including software recommendations 368b-1, crash risks 368b-2, faults 368b-3, and others 368b-n. The digital representations 362 and analytics and insights 366 are detailed below.

The success track contextualization 364d-1 is a view of a selected success track including its assets 370 such as one or more of the network/computing equipment and software 102(1)-102(N) at the enterprise sites 110(1) and 110(N), its services 372, and applicable analytics 374 selected from the analytics and insights 366.

The aggregate representation 364d-2 is a view that includes journey across use cases 220a-n for each of the success tracks 210a-n of FIG. 2. Specifically, each success track (ST1, ST2, . . . ) has a number of use cases (UC1, UC2, . . . ). Each use case has a respective one of the racetracks 380a-n. The racetrack represents adoption lifecycle and an indicator 382 represents the progression of the network technology for the respective use case.

The adoption journey contextualization 364d-3 is a view of a selected use case such as the use case 220a of FIG. 2 and includes a racetrack 380a. The indicator 282 indicates the progression of the network technology along the adoption lifecycle for this particular use case 220a. For the respective point along the adoption lifecycle, guided activities 386 such as the support content 232 and insights 234 of FIG. 2, are provided. Additionally, an expert engagement 388, an example of a premium support resource, may also be made available to help progress the selected use case 220a of the network technology along the adoption lifecycle.

The cloud portal 100 uses analytics 384 to generate task lists 390 (action sets 228a-n of FIG. 2) to progress the network technology to the next stop 392 along the adoption lifecycle.

At 394, the cloud portal 100 threads the enterprise data and support content from the data sources 310 to generate the contextualization 360. For example, the digital representation 362 of the enterprise IT environment is generated based on a portfolio of hardware/software assets and services from one or more providers obtained from the enterprise data 322 of the data sources 310.

At 396, the cloud portal 100 filters the enterprise data and content from the data sources 310 to only include data and content relevant to a particular use case of the network technology and generates the adoption journey view 364d-3 using IC 338 or other analytics engines, for example.

The generated contextualization 360 may be hierarchical. In one example embodiment, the contextualization 360 is presented in a 2- or 3-layer hierarchy. Each layer has its own unique substructure. The first layer represents enterprise intent and outcome of the network technology. The second layer includes key aspects or facets of the network technology. The third layer is a collection of threaded data structures representing significant properties and characteristics of the selected facet such as progression along the adoption lifecycle for a specific use case, deployment, etc. The contextualization 360 ensures the information of the enterprise environment is presented timely and is relevant and useful.

Figure 4:
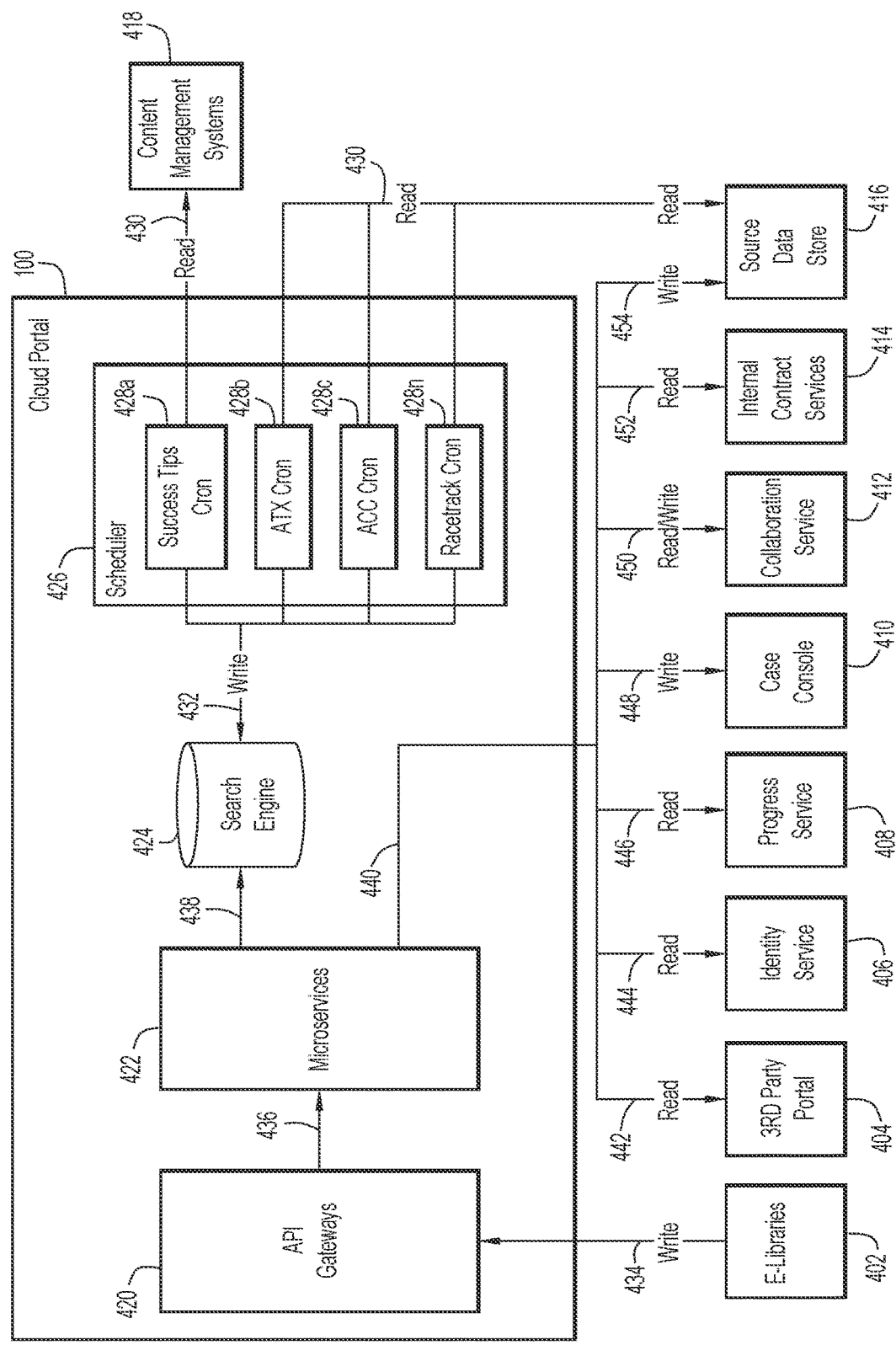
FIG. 4 is a high-level flow diagram of a system that includes the cloud portal for managing enterprise resources and progressing network technologies of an enterprise through an adoption lifecycle, according to an example embodiment.

FIG. 4 is a high-level flow diagram of a system 400 that includes the cloud portal 100 for managing enterprise resources and progressing network technologies of an enterprise through an adoption lifecycle, according to an example embodiment. The system 400 further includes an electronic learning libraries (e-libraries) 402, a third party portal 404, an identity service 406, a progress service 408, a case console 410, a collaboration service 412, an internal contract service 414, a source data store 416, and content management systems 418.

The cloud portal 100 includes an Application Programming Interface (API) gateways 420, microservices 422, a search engine 424 such as an elasticsearch engine, and a scheduler 426 that schedules one or more cron jobs 428a-n such as a success tips cron 428a, an ask the expert (ATX) cron 428b, accelerator (ACC) cron 428c, and a racetrack cron 428n. The system 400 manages enterprise resources and progresses technologies through the adoption lifecycle as follows.

At 430, the scheduler 426 uses the cron jobs 428a-n to read data from various sources including content management systems 418 and source data store 416 using public APIs. At 432, the scheduler 426 provides the data for use by the search engine 424.

At 434, the e-libraries 402 write or post data to the API gateways 420. The data includes support resources such as courses or product guides about various network technologies at various progressions along the lifecycle. At 436, the API gateways 420 provide the data to microservices 422. In one example, the microservices 422 are hosted by a Kubernetes cluster. At 438, the microservices 422 analyze the data and generate relevant information for the search engine 424. The microservices 422 may further extract relevant information from the search engine 424 for analysis and processing.

At 440, the microservices 422 are further configured to communicate with various additional data sources. For example, at 442, the microservices 422 reads or obtains asset information from the 3$^{rd}$ party portal 404 such as the portal of a service or network provider. At 444, the microservices 422 fetch user profile with access or authorization level for the user and/or the enterprise. At 446, the microservices 422 obtain, from the progress service 408, user's progress or the progress of the enterprise in studying various courses or e-learning materials from the e-libraries 402. At 448, the microservices 422 provide, to the case console 410, various requests for one-on-one training, support, or to open a troubleshooting case. At 450, the microservices 422 communicate with the collaboration service 412 to register or confirm a user (network operator or network administrator) for a collaboration session. To schedule and/or conduct various collaboration sessions or to provide learning material, at 452, the microservices 422 obtain, from the internal contract services 414, learning quotas associated with the enterprise contracts and service support. In one example, data obtained via the internal contract services 414 may only be accessible within the enterprise network. At 454, the microservices 442 post or provide various action sets such as checklists, to the source data store 416. The microservices 442 may select various action sets applicable to the enterprise network and store them in the source data store 416 to help progress one or more of the network technologies along the adoption lifecycle, as detailed below.

Figure 5A:
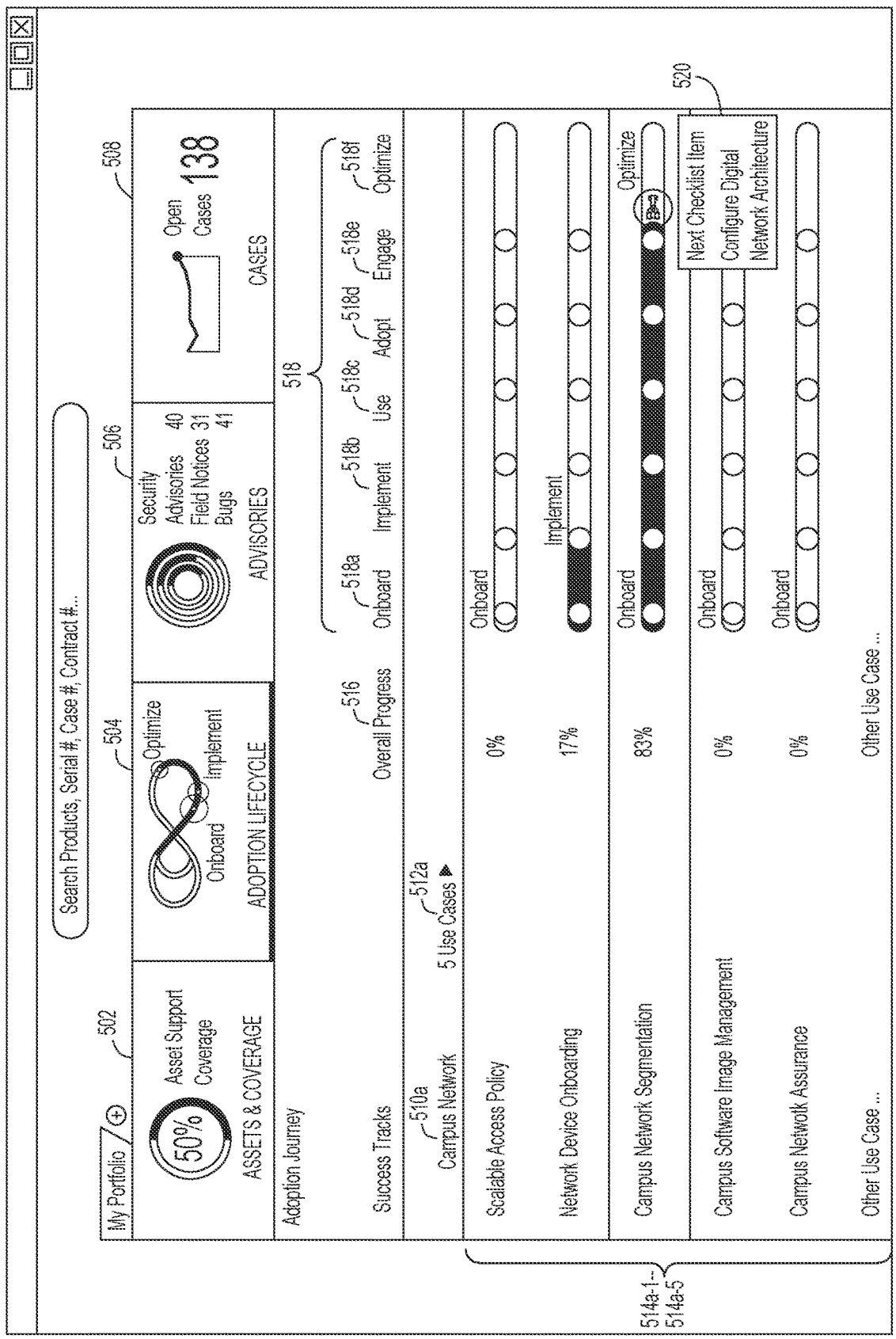
FIGS. 5A and 5B are user interface screen shots illustrating a high-level view of network technologies of an enterprise along with their respective states in the adoption lifecycle for each use case, according to an example embodiment.
Figure 5B:
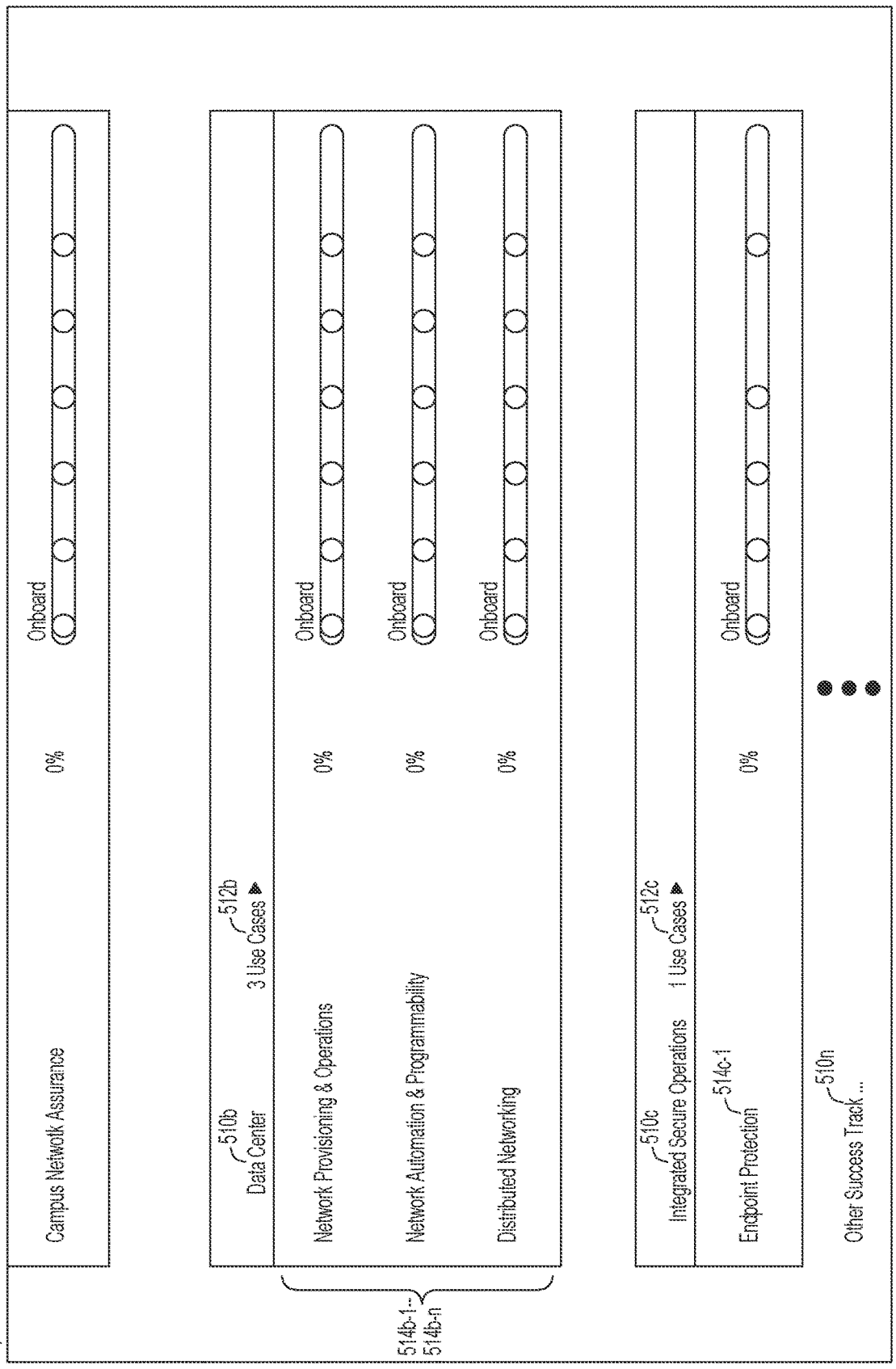

FIGS. 5A and 5B are user interface screen shots illustrating a high-level view 500 of network technologies of an enterprise along with their respective states in the adoption lifecycle for each use case, according to an example embodiment. The cloud portal 100 contextualizes the data sources 310 of FIG. 3 to generate the high-level view 500, referred to as "My Portfolio."

The high-level view 500 shows assets and coverage aggregated from various domains (enterprise sites 110(1)-110(N) of FIG. 1). At various levels of context selection included in the high-level view 500, the assets and coverage (along with content in the other facets and views) are shown across all of the enterprise domains. For a user logging into the cloud portal 100 without any active access control restrictions, the high-level view 500 represents a holistic, cross-domain view of the enterprise hardware/software assets and services purchased from various providers. In the event the user's view is limited by access control policies, the high-level view 500 encompasses the top-most aggregation of all domains and assets/services that the user is permitted to view. The high-level view 500 includes various facets of an enterprise network, such as an asset and coverage facet 502, an adoption lifecycle facet 504, an advisories facet 506, and a cases facet 508.

The asset and coverage facet 502, as an example, may include total number of assets aggregated across various domains, such as the enterprise sites 110(1)-110(N), a number of connected assets, an asset coverage such as warranty and/or technical support, assets for which the warranty is soon to expire, and assets not covered by any warranty, and asset roles such as access, aggregation, branch, core edge, etc. The assets and coverage facet 502 may further include a list of assets with an asset name, a product identification, a product description, a number of available advisories or contextual insights, location, warranty coverage, and other attributes. The type of assets may be malware protection (AMP) for endpoints, other software products, and hardware products such as network devices. The assets may reside in the enterprise network and/or in one or more clouds. The types and number of assets vary depending on a particular deployment scenario.

The adoption lifecycle facet 504 is selected in the high-level view 500, as an example, and involves a system for visualizing, presenting, and tracking the status (hybrid vendor/enterprise/telemetry based input) of an enterprise adoption journey or an enterprise progress along the adoption lifecycle with their network technologies, with integrated learning and support resources embedded in context of the enterprise's current/future guided adoption tasks. This informs the enterprise where they are on the adoption journey, as well as the next steps, based on telemetry and insights.

In this example scenario, the adoption lifecycle facet 504 includes success tracks 510*a-n*, which are examples of network technologies, such as a campus network success track 510*a* in FIG. 5A, and data center success track 510*b*, an integrated secure operations success track 510*c*, and another success track 510*n* in FIG. 5B. The types and number of network technologies vary depending on a particular deployment scenario.

The success tracks 510*a-n* have a number of use cases indicators 512*a-n* and a list of their use cases 514*a-n*. For each use case, an overall progress 516 and progress along various stages in the adoption lifecycle 518 are provided. In this non-limiting example, the adoption lifecycle 518 is in a form of stages 518*a-f* such as an onboard stage 518*a*, an implement stage 518*b*, a use stage 518*c*, an adopt stage 518*d*, an engage stage 518*e*, and a maximize utilization value (optimize) stage 518*f*. Based on the progression along the adoption lifecycle 518, the cloud portal 100 generates action sets 520. The action sets 520 includes actions, tasks, and/or triggers to progress along the adoption lifecycle 518.

The campus network success track 510*a* has a number of use cases indicator 512*a* that indicates 5 use cases and a list of these use cases 514*a*-1 to 514*a*-5 such as a scalable access policy use case 514*a*-1, a network device onboarding use case 514*a*-2, a campus network segmentation use case 514*a*-3, a campus software image management use case 514*a*-4, and a campus network assurance use case 514*a*-5. As an example, the network device onboarding use case 514*a*-2, has the overall progress 516 at 17% and is at the implement stage 518*b* in the adoption lifecycle 518. The campus network segmentation use case 514*a*-3 has the overall progress 516 at 83% and is at the engage stage 518*e* in the adoption lifecycle 518. The action sets 520 is a next checklist item such as "configure digital network architecture".

The data center success track 510*b*, in FIG. 5B, has a number of use cases indicator 512*b* that indicates 3 use cases and a list of these use cases 514*b*-1 to 514*b*-3 such as a network provisioning and operations use case 514*b*-1, a network automation and programmability use case 514*b*-2, and a distributed networking use case 514*b*-3.

The integrated secure operations success track 510*c* has a number of use cases indicator 512*c* indicating 1 use case, which is an endpoint protection use case 514*c*-1.

Tools may be provided for manipulating information depicted in the high-level view 500 such as selecting a particular use case, adding new use cases, success tracks, display filtering, selecting one of the action sets 520 to perform an action to progress along the adoption lifecycle 518, etc.

The advisories facet 506 includes security advisories, field notices, bugs, supporting materials, etc. The advisories facet 506 is specific to the enterprise network and its assets.

The open cases facet 508 includes a number of support cases and/or open issues (troubleshooting) for the enterprise. The open cases facet 508 may include details about all cases or a particular group of cases specific to a particular context and/or use case scenario and/or access level of the user. The case details may include severity, case numbers, title, description of actions taken, duration, status, owner, last update, etc.

Figure 6:
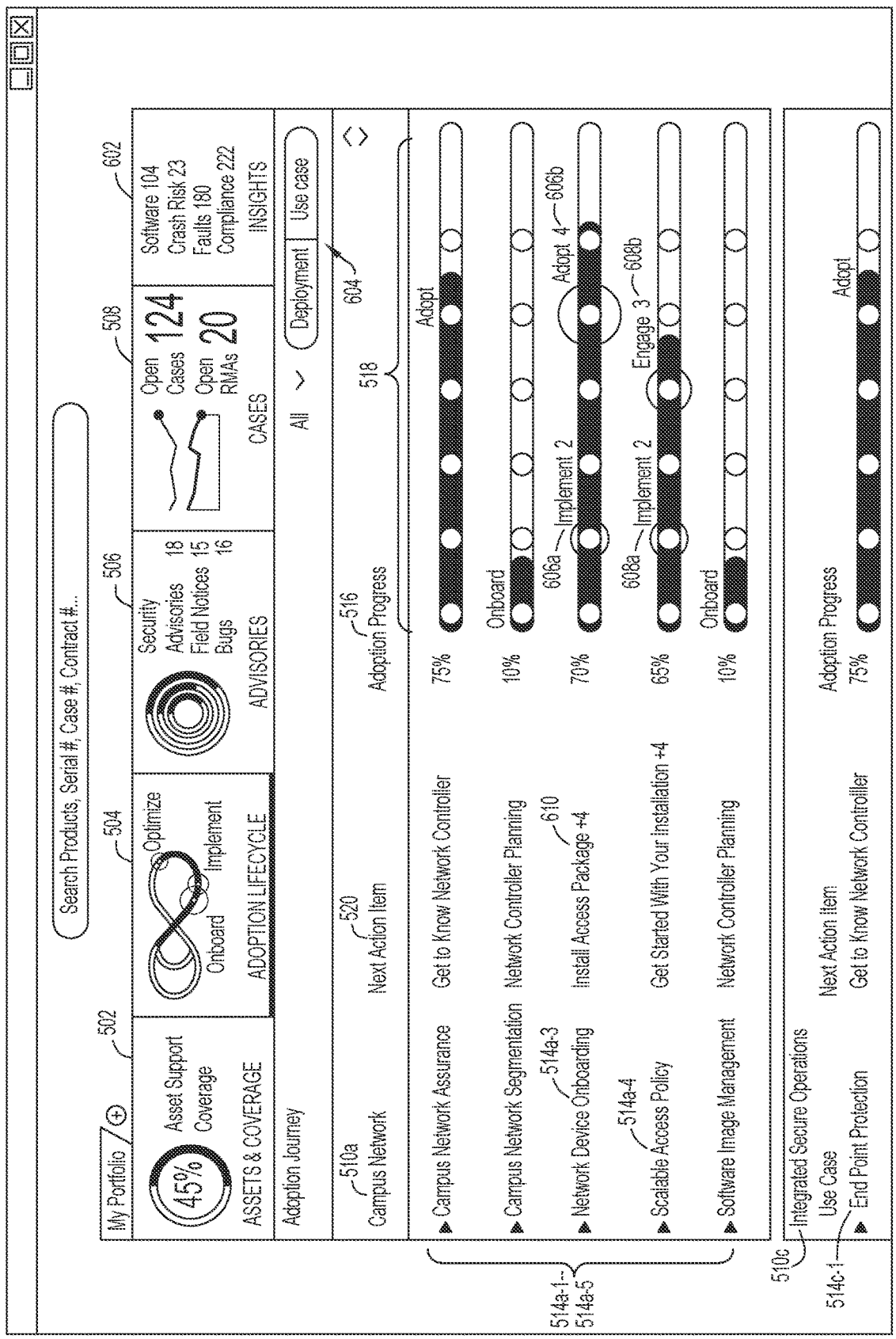
FIG. 6 is a user interface screen shot illustrating a unified view of tracking progress along the adoption lifecycle of deployments of a network technology, according to an example embodiment.

FIG. 6 is a user interface screen shot illustrating a unified view 600 for tracking progress along the adoption lifecycle of deployments of network technologies of an enterprise, according to an example embodiment. The cloud portal 100 tracks various deployments and generates the unified view 600.

Depending on the network domain platforms underpinning each technology solution, the adoption lifecycle 518 is further enhanced to support tracking progress across multiple independent deployments e.g. domain controllers or enterprise sites 110(1)-110(N), etc. within the unified view 600. The unified view 600 includes an insights facet 602, which provides various support resources generated from threading data from the data sources 310 in FIG. 3. The unified view 600 includes tools 604 for manipulating the view based on use cases, deployments, or other filters (all).

In the unified view 600, the tools 604 are set to "use cases" such that deployments are depicted based on use cases. Specifically, in the campus network success track 510a, the Network Device Onboarding use case 514a-3 and the Scalable Access Policy use case 514a-4, both have multiple deployments i.e. domain controllers 240a-n of FIG. 2, in process of deploying and adopting this network technology for these use cases.

The progression of the deployments along the adoption lifecycle 518 is visualized using circular rings of varying sizes, indicating how many deployments are at a given stage of the adoption lifecycle 518 for this particular use case. This is but one non-limiting example and the location and number of the deployments may be visualized by other indicators of different geometric shapes, sizes, colors, shadings, etc.

In the unified view 600, the Network Device Onboarding use case 514a-3 has two deployments at the implement stage 518b (depicted with a first circle 606a) and four deployments at the adopt stage 518d (depicted with a second circle 606b of an incrementally larger size such that the size of the circle grows as the number of deployments increases). The Scalable Access Policy use case 514a-4 has two deployments at the implement stage 518b in the adoption lifecycle 518 (depicted with a third circle 608a) and three deployments at the engage stage 518e (depicted with a fourth circle 608b of an incrementally larger size then the third circle 608a but smaller than the second circle 606b).

Since deployments of the same use case can be at various progression points in the adoption lifecycle 518, a next action item (action sets 520) may be a list of actions specific to one or more deployments in the use case. The cloud portal 100 generates an indicator 610 to indicate a number of actions in an action set. Each action in the action set is contextual to a specific deployment(s) in the use case.

Additionally, the cloud portal 100 generates detailed or low-level views to convey which deployments of an enterprise are at which stage in the adoption lifecycle 518, the next action item (action sets 520), and capabilities recently achieved to further incentivize and to communicate the value of progression along the adoption lifecycle 518.

Figure 7:
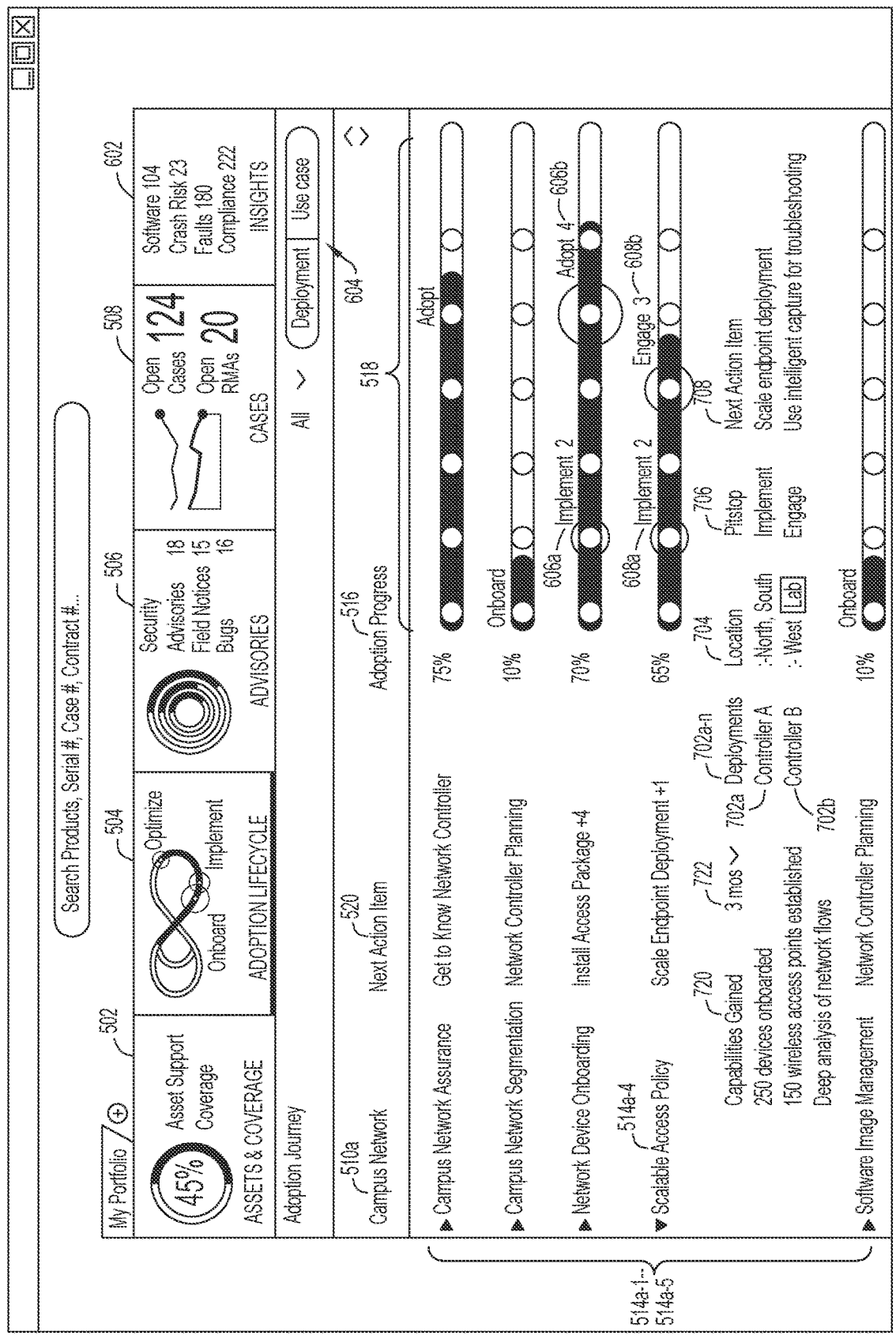
FIG. 7 is a user interface screen shot illustrating a detailed view of tracking progress along the adoption lifecycle of individual deployments for a selected use case of a network technology, according to an example embodiment.

FIG. 7 is a user interface screen shot illustrating a detailed view 700 of tracking progress along the adoption lifecycle 518 of individual deployments for the selected Scalable Access Policy use case 514a-4 of the campus network success track 510a, according to an example embodiment. The detailed view 700 includes individual deployments 702a-n with additional information such as a location 704 of the deployment, the next stage (a pit stop) 706 for the deployment, and the next action item 708 to progress along the adoption lifecycle 518 for the deployment.

The first deployment 702a is for a domain controller A, at the location 704 of North and South, the next stage 706 is the implement stage 518b in the adoption lifecycle 518, and the next action item 708 is to "scale endpoint deployment". The second deployment 702b is for a domain controller B, at the location 704 of West Lab, the next stage 706 is the engage stage 518e in the adoption lifecycle 518, and the next action item 708 is to "use intelligent capture for troubleshooting".

The detailed view 700 further includes gained capabilities 720 for a duration 722. The gained capabilities 720 provide another insight into the progression of the network technology (the success track for a particular use case). In the detailed view 700, in the last three months, the Scalable Access Policy use case 514c-4 onboarded 250 devices, established 150 wireless access points, and performed deep analysis of network flows. The duration 722 can be set by the user for a predetermined time such as in the past day, week, month, etc.

In addition to analyzing the telemetry data to track network technologies' progression along the adoption lifecycle, the cloud portal 100 analyzes the telemetry data to generate specific contextualized insights.

Figure 8:
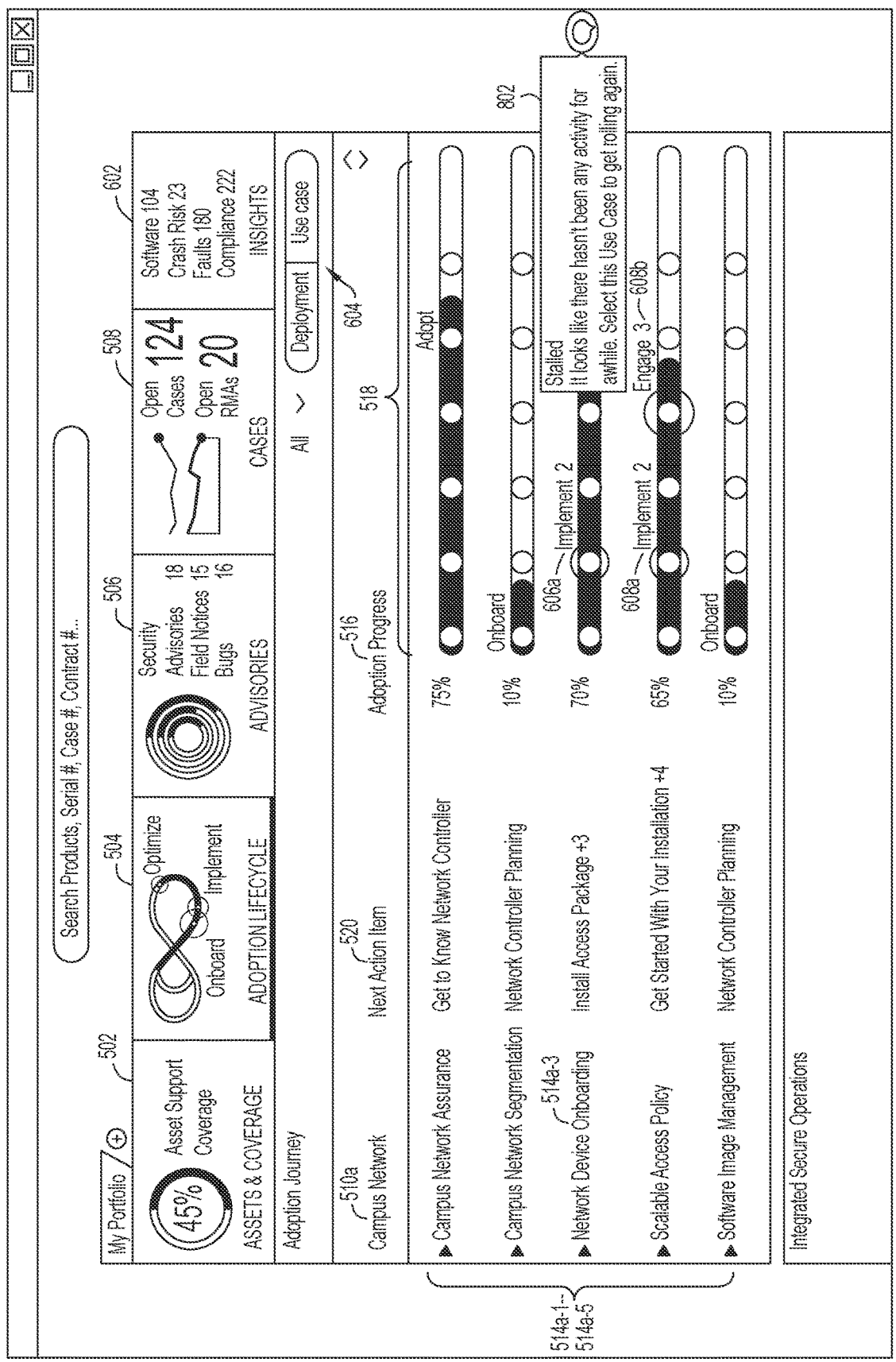
FIG. 8 is a user interface screen shot illustrating a specialized view of providing an insight based on progress along the adoption lifecycle of a use case of a network technology, according to an example embodiment.

FIG. 8 is a user interface screen shot illustrating a specialized view 800 of providing a contextual insight based on progress along the adoption lifecycle 518 of the Network Device Onboarding use case 514a-3 of the campus network success track 510a, according to an example embodiment. The cloud portal 100 analyzes the product and network telemetry 242 of FIG. 2 using machine learning, artificial intelligence, engines, etc. to track progress along the adoption lifecycle 518 and to generate contextual insights based on this progress.

For example, if a lack of activity contributing to the progression along the adoption lifecycle 518 has been detected, based on either pre-defined system rules such as no progress in X days or dynamically derived measurements, such as lack of progress relative to how quickly other enterprises typically progress, a contextual insight 802 is generated, such as "it looks like there hasn't been any activity for a while. Select this Use Case to get rolling again."

The contextual insights and recommendations are generated to flag or alert an enterprise to an area worthy of investigation on the path to achieving their desired outcomes and to generate support resources that are helpful to complete the next action item (action sets 520) to progress past the current stage to the next stage in the adoption lifecycle 518. The cloud portal 100 may determine various outcomes based on analyzing the telemetry data, the progression along the adoption lifecycle 518, and classifying each outcome into a respective category such as the adoption time category of FIG. 8, a performance related category, a troubleshooting related category, and a support case category. The cloud portal 100 may generate one or more action sets for each outcome and related contextual insights.

Within a more granular context selection of a specific success track and use case, the adoption lifecycle 518 presents an enterprise with a guided set of activities and support resources that are tagged to this specific technology domain, use case, adoption journey stage, and activity. In one example, within a specific use case and adoption journey stage, the creation of these activities and tagging of the support resources may be performed manually at a provider curating this experience, derived programmatically from product documentation and content management systems (CMS), or a hybrid combination thereof. The techniques presented herein narrow down the universe of available support and learning materials (support resources) specifically to those, and even parts/snippets of support resources, that are most directly relevant and actionable for enterprises in context of completing their prescribed adoption tasks and activities.

Figure 9:
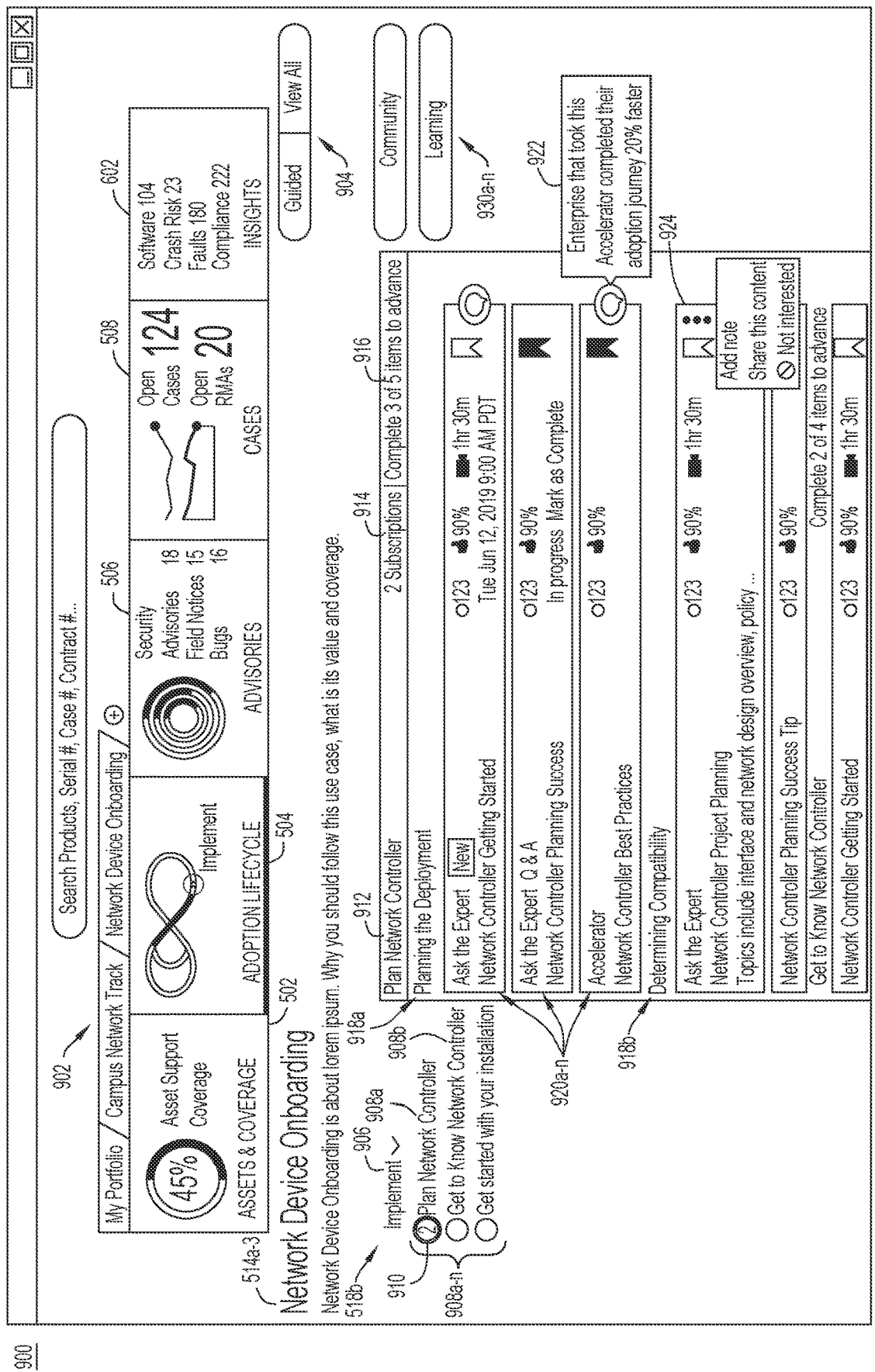
FIG. 9 is a user interface screen shot illustrating a detailed view of providing support resources, specific to a selected use case of a network technology, for progressing from the current stage to the next stage in the adoption lifecycle, according to an example embodiment.
Figure 10A:
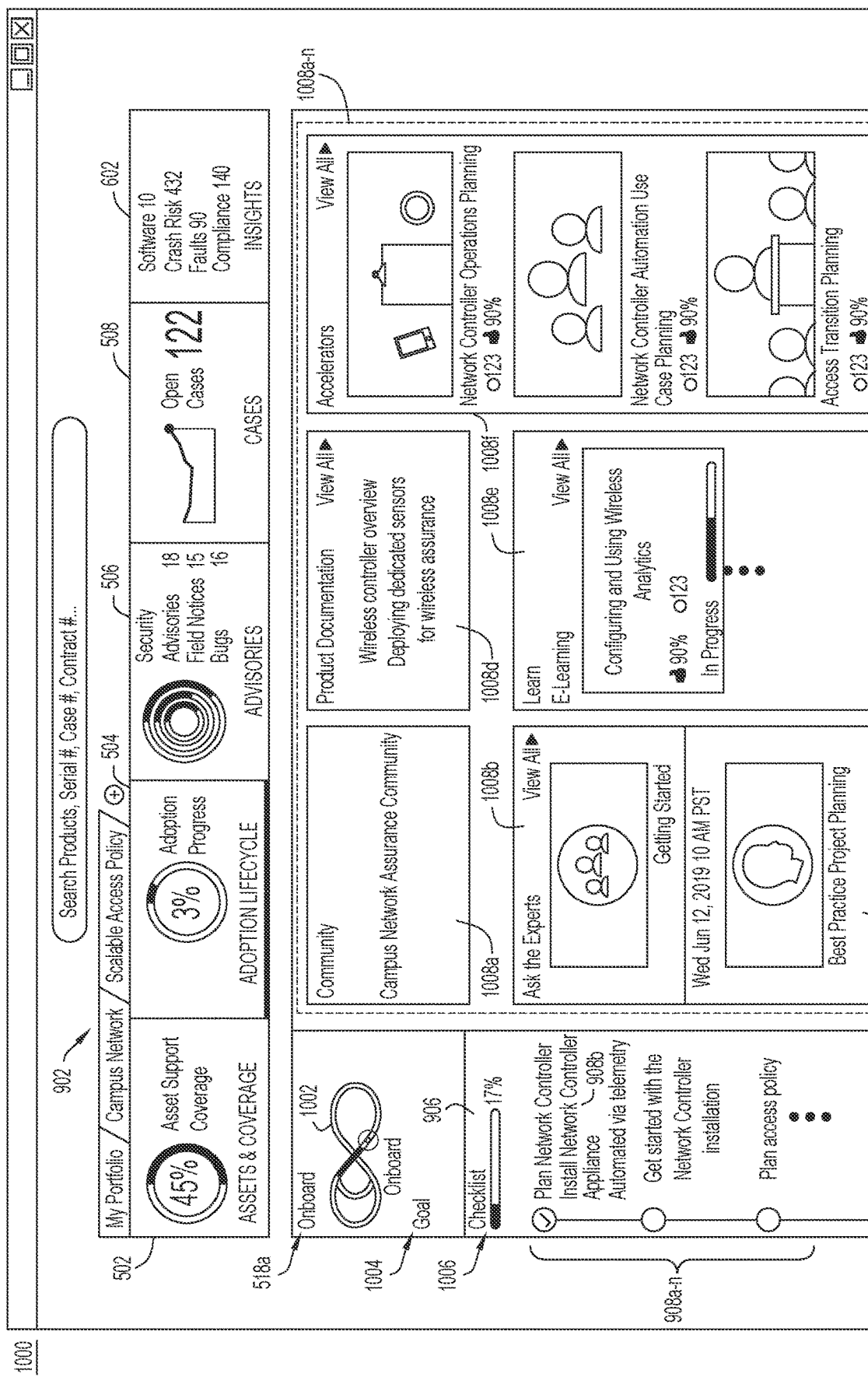
FIGS. 10A and 10B are user interface screen shots illustrating other detailed views of providing support resources, specific to a selected use case of a network technology, for progressing from the current stage to the next stage in the adoption lifecycle, according to another example embodiment.
Figure 10B:
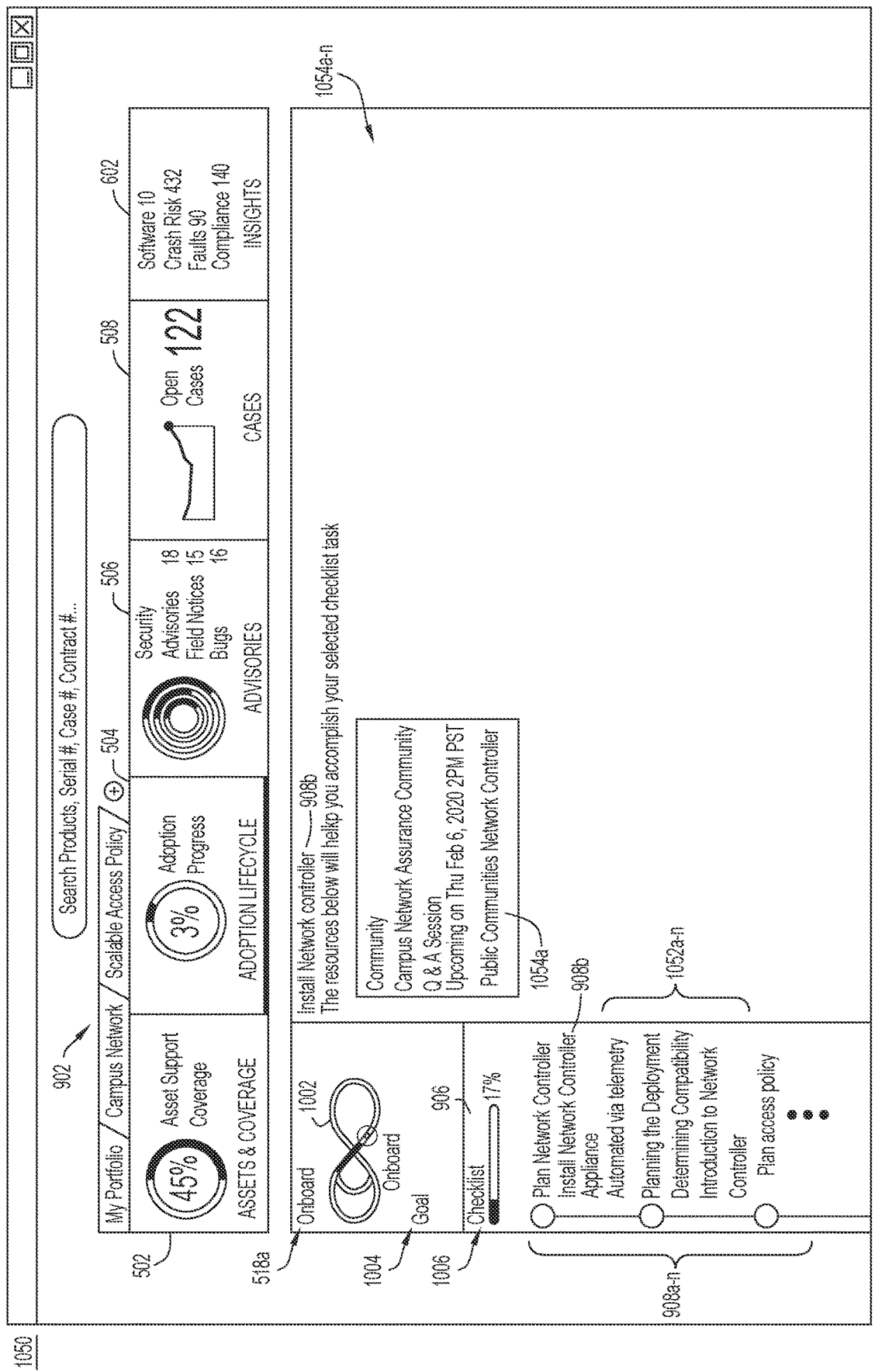

FIGS. 9, 10A, and 10B are examples of various acceleration plans that are offered in response to the progression along the adoption lifecycle 518 being stalled, as shown in FIG. 8.

FIG. 9 is a user interface screen shot illustrating a detailed view 900 of providing support resources specific to the Network Device Onboarding use case 514a-3 of the campus network success track 510a for progressing from the implement stage 518b (current stage) to the use stage 518c (the next stage) in the adoption lifecycle 518, according to an example embodiment.

The detailed view 900 has context selection tools 902 to select a success track, a use case, a deployment, etc. and view tools 904 to view all available support resources or guided activity sets. The detailed view 900 includes a selected action set 906 in a form of a checklist with actions 908a-n and a progress indicator 910 to indicate progress of the current action. Performing an action may change a configuration of one or more assets such as the network/computing equipment and software 102(1)-102(N).

The detailed view 900 further includes the current action 912 (the first action 908a of planning the network controller), a number of subsections indicator 914 that indicates that there are 2 subsections, a number of items indicator 916 that indicates that 3 items need to be completed to progress to the next action item (the second action 908b), and support resources 920a-n to help complete the current action 912.

The support resources 920a-n may be divided into sections such as planning the deployment subsection 918a and determining compatibility subsection 918b. The support resources 920a-n may include consulting services, accelerator courses, product guides, one-on-one tutoring sessions, e-learning courses, etc. Some of the support resources 920a-n may have an additional notification 922 such as the use of this resource helps accelerate progression along the adoption lifecycle 518 by 20%. The support resources 920a-n may further include individual feature tools 924 for adding notes, sharing content, indicating lack of interest, etc.

Access to some of the support resources 920a-n may be provided via resource links 930a-n such as the provider's community content, e-learning material, etc. Based on selecting one of the resource links 930a-n, the detailed view 900 is changed to provide the selected support resource that is specifically targeted to the current action 912.

FIGS. 10A and 10B are user interface screen shots illustrating other detailed views 1000 and 1050, respectively, for providing support resources specific to the Scalable Access Policy use case 514a-4 of the campus network success track 510a for progressing from the onboard stage 518a (the current stage) to the implement stage 518b (the next stage) in the adoption lifecycle 518, according to other example embodiments.

The detailed view 1000 includes a racetrack indicator 1002 to show the progression of the Scalable Access Policy use case 514a-4 along the adoption lifecycle 518. The racetrack indicator 1002 represents the adoption lifecycle 518.

The detailed view 1000 further includes the goal 1004 of the onboard stage 518a, which includes outcomes that are to be achieved by completing the onboard stage 518a such as identify a success criteria, plan an access policy, become familiar with data network architecture, learn how to onboard network devices, etc.

The detailed view 1000 also includes a selected action plan 906 such as a checklist with actions 908a-n and a progress bar 1006 that shows progression of completing actions 908a-n in the selected action plan 906. Executing an action in the selected action plan 906 may change a configuration of one or more assets such as the network/computing equipment and software 102(1)-102(N). The configuration change may include enabling or disabling certain features of a software product and/or changing configuration of a network device by connecting a port to a network, etc.

The detailed view 1000 further includes support resources 1008a-n specific to the onboard stage 518a and/or the current action being performed (the second action 908b of installing the network controller appliance (automated via telemetry). The support resources 1008a-n are generated by threading data from the data sources 310 of FIG. 3 and may include a first support resource 1008a such as community content, a second support resource 1008b such as topic-based webinars (ask the expert), a third support resource 1008c such as best practice guides, a fourth support resource 1008d such as product documentation, a fifth support resource 1008e such as learning materials, a sixth support resource 1008f such as accelerators, etc.

The detailed view 1050 includes sub-actions 1052a-n for the second action 908b such as planning for deployment, determining compatibility, and introduction to the network controller. The support resources 1054a-n are specifically targeted to the second action 908b of installing the network controller. For example, the community content 1054a provides guides for installing the network controller. The cloud portal 100 maps support content from the data sources 310 of FIG. 3 that helps perform the current action to move to the next action or sub-action.

In one or more example embodiments, a combination of human and digital support/learning resources include product guides and documentation, online community threads, topic-based webinars, 1-on-1 coaching sessions, e-learning content, customized group training classes, among other possibilities. The user directly interacts and engages with the various support resources including registering for sessions, reading documentation, watching live or on-demand videos, etc. to progress the network technology for a particular use case and/or particular deployment along the adoption lifecycle 518.

Figure 11A:
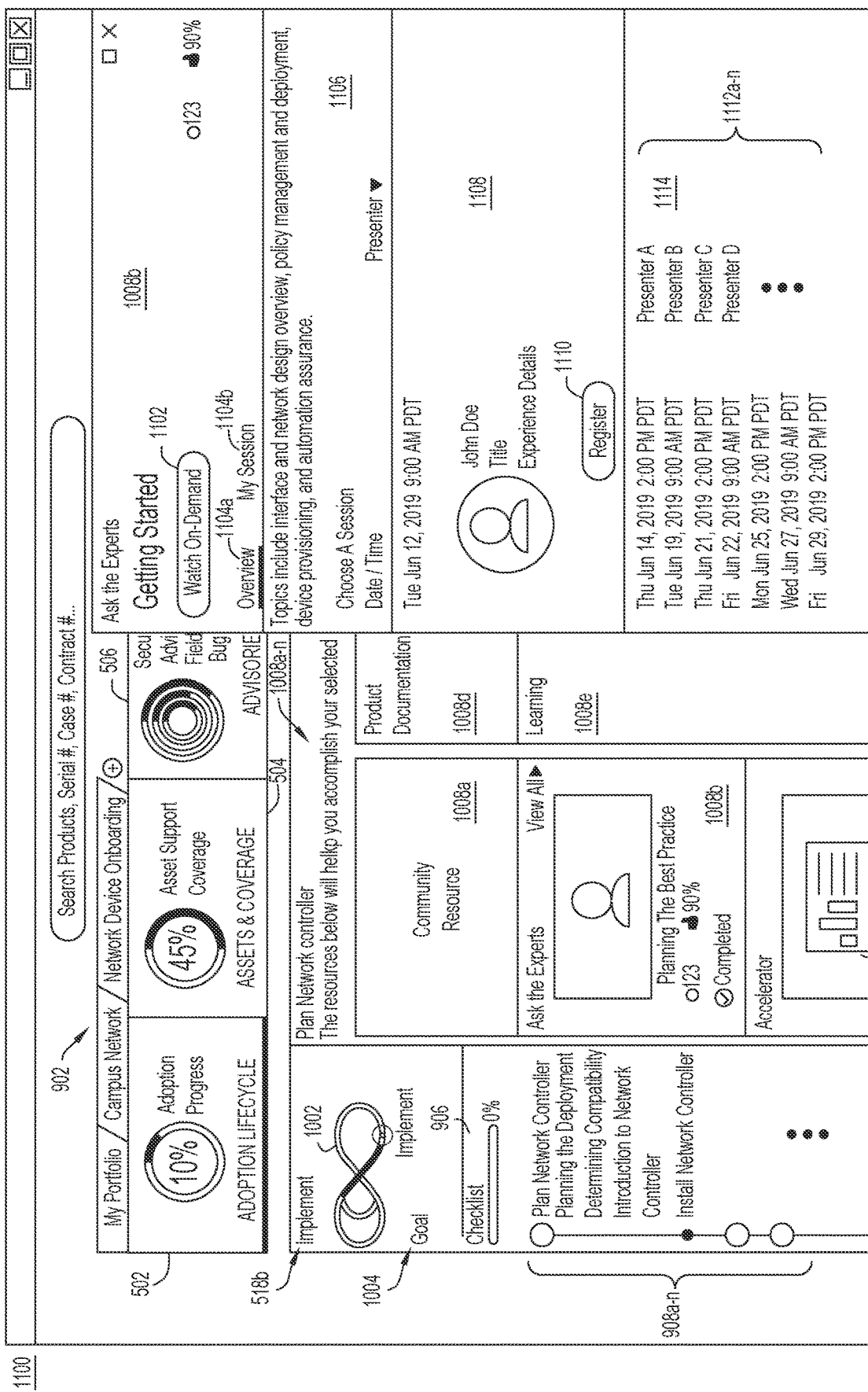
FIGS. 11A and 11B are user interface screen shots illustrating specialized views of incorporating entitlement checks and content limits for the support resources, according to various example embodiments.
Figure 11B:
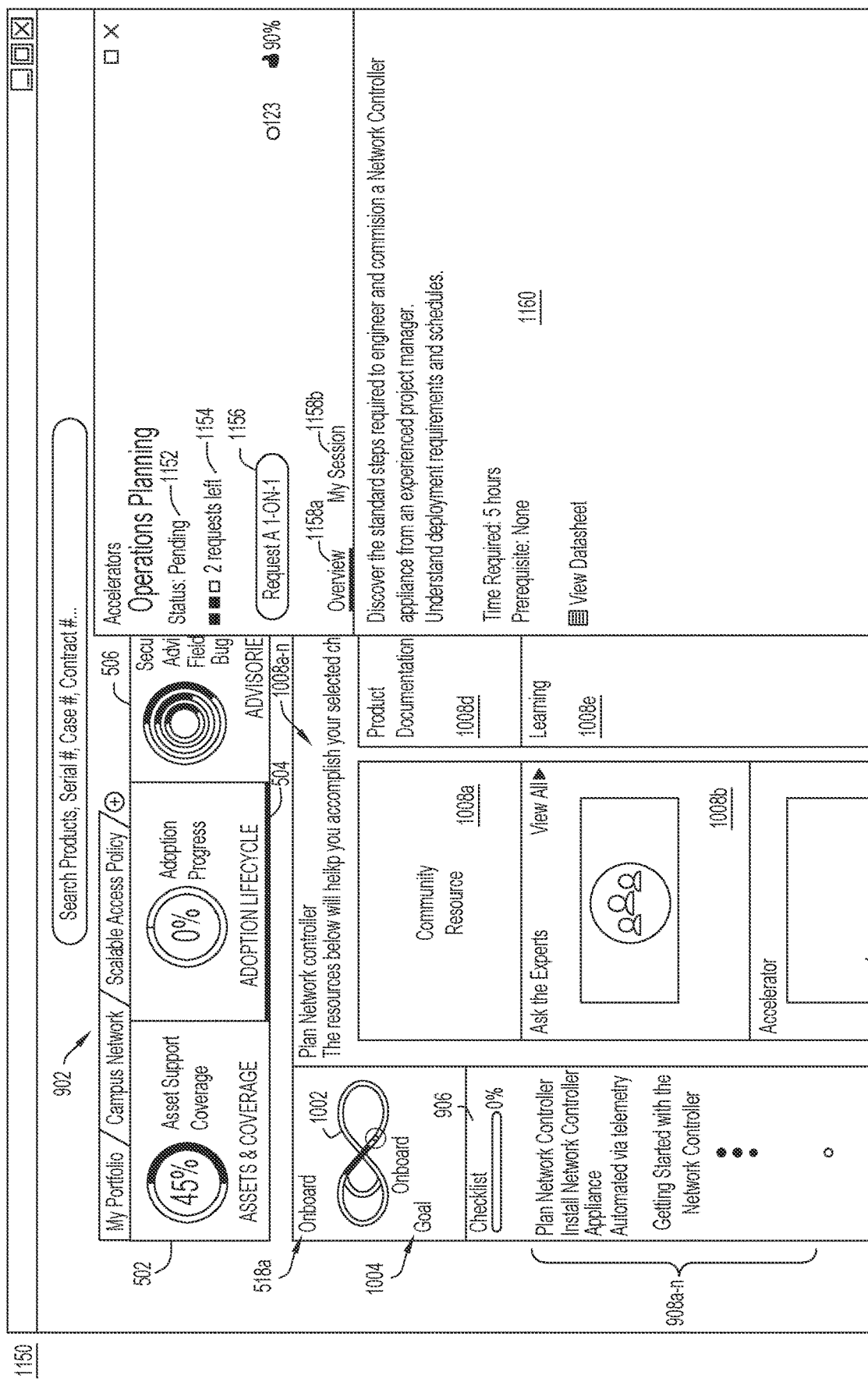

FIGS. 11A and 11B are user interface screen shots illustrating specialized views 1100 and 1150, respectively, of incorporating entitlement checks and content limits for support resources, according to various example embodiments. The cloud portal 100 generates, based on the product and network telemetry 242 of FIG. 2, the specialized views 1100 and 1150 that include entitlement check and utilization limits for the support resources 1008a-n.

In the specialized view 1100, the second support resource 1008b (ask the expert) is selected. The second support resource 1008b includes an action tool 1102 to watch a recording of the session content (watch on demand), an overview section 1104a and enterprise (my) sessions section 1104b. The overview section 1104a includes a topic overview 1106 and session details 1108 such as the name of the presenter, the title of the presenter, and experience details, etc. The enterprise sessions section 1104b includes a list of sessions that are available and applicable to the enterprise, the network technology, the use case, and/or deployment based on the enterprise and/or user's access level.

The specialized view 1100 further includes registration tools 1110 to register for a selected course or session and a list of other sessions 1112a-n with an arrow tool 1114 to view additional details.

The cloud portal 100 generates the support resources 1008a-n and/or the list of other sessions 1112a-n based on an authorization or permission level of the user. Specifically, the cloud portal 100 incorporates checks of the user's level of entitlement to support resources 1008a-n within a given success track, and their view/experience of the adoption lifecycle 518 and dynamically adapts to remove support resources, which the user is not entitled to view. If the user is entitled to a finite number of resources of a certain type over a specified duration, the cloud portal 100 indicates these limitations and restricts further content consumption of the specified type when the limit is reached, and may offer the user the opportunity to purchase additional support resources such as additional sessions.

The specialized view 1150 includes content limit check, according to one example embodiment. In the specialized view 1150, a third support resource 1008c (accelerator) is selected and it includes one-on-one sessions. The specialized view 1150 includes a resource status 1152 (pending, expired, not yet started, etc.), a resource limit 1154 (two requests left), and a request tool 1156 to schedule the one-on-one session.

The specialized view 1150 further includes an overview section 1158a and an engagement section 1158b. The overview section 1158a provides details 1160 about the one-on-one support session such as session description, experience of the technical assistant, time required, and prerequisites, if any. The cloud portal 100 analyzes the user profile to determine if the prerequisites are met (entitlement check) and does not provide any support resources for which the user did not meet the required prerequisites. The engagement section 1158b may show the user's or the enterprise's contract for the one-on-one support sessions and provide tools to obtain additional one-on-one support sessions (purchase, extend warranty contract, add to a subscription, etc.). The cloud portal 100 may generate the specialized view 1150 specific to the enterprise or on granular levels of user groups, or specific to a particular user.

The cloud portal 100 threads various data from disparate sources to guide enterprises along the adoption journey of their network solutions and to accelerate speed to value of their network technologies. The techniques presented herein aggregate disparate cross-domain data for understanding progression of network technologies of an enterprise along their adoption journey and provide action plans that include actionable triggers to advance along the adoption lifecycle based on product and network telemetry and by providing support resources specific to the current stage or progression point of the adoption lifecycle of a network technology for a particular use case and/or deployment. The techniques presented herein thread the disparate cross-domain data to support and accelerate adoption journey of technology solutions and enable an enterprise success of maximizing value of its IT environment.

Figure 12:
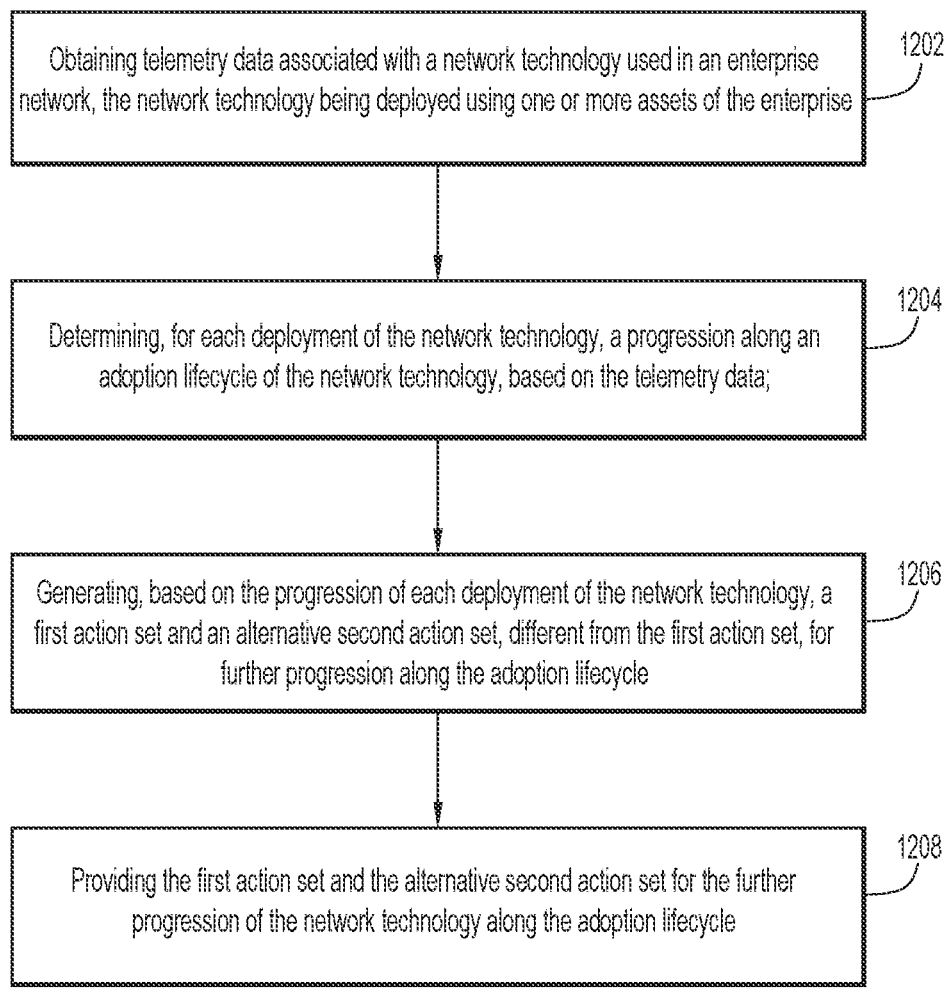
FIG. 12 is a flowchart illustrating a method of generating action sets for progressing along an adoption lifecycle of a network technology, according to an example embodiment.

FIG. 12 is a flowchart illustrating a method 1200 of generating action sets for further progression along the adoption lifecycle, according to an example embodiment. The method 1200 may be implemented by a computing device such as a server or a group of servers that execute the cloud portal 100 of FIG. 1.

At 1202, the method 1200 involves obtaining telemetry data associated with a network technology used in an enterprise network. The network technology is deployed using one or more assets of the enterprise network.

At 1204, the method 1200 involves determining, for each deployment of the network technology, a progression along an adoption lifecycle of the network technology, based on the telemetry data.

At 1206, the method 1200 involves generating, based on the progression of each deployment of the network technology, a first action set and an alternative second action set, different from the first action set, for further progression along the adoption lifecycle.

At 1208, the method 1200 further involves providing the first action set and the alternative second action set for the further progression of the network technology along the adoption lifecycle.

In one form, the method 1200 may further include obtaining a selection of the first action set and performing at least one action in the first action set to change a configuration of the one or more assets, based on the selection.

In another form, the method 1200 may further involve obtaining additional telemetry data associated with the network technology after performing the at least one action and determining, for each deployment of the network technology, additional progression along the adoption lifecycle, based on the additional telemetry data. The method 1200 may further involve generating insights based on the additional progression. The insights include a new or updated first action set and a new or updated alternative second action set.

In one instance, the operation 1204 of determining the progression along the adoption lifecycle may include determining a stage among a plurality of stages of the adoption lifecycle. The plurality of stages including at least two of an onboarding stage, an implementation stage, a use stage, an adoption stage, an engagement stage, and a maximizing use value stage.

According to one or more example embodiments, the operation 1206 of generating the first action set and the alternative second action set may include determining at least two outcomes based on analyzing the telemetry data and the progression along the adoption lifecycle and classifying each of the at least two outcomes into a respective category selected from one or more of an adoption time category, a performance related category, a troubleshooting related category, and a support case category. The operation 1206 of generating the first action set and the alternative second action set may further include generating the first action set for one of the at least two outcomes and the alternative second action set for another one of the at least two outcomes.

In the method 1200, the network technology may have at least two use cases, each deployed using a plurality of assets of the enterprise network. The method 1200 may further involve determining, for each of the at least two use cases, a respective stage among a plurality of stages of the adoption lifecycle, based on the progression of each deployment associated with a respective use case and generating a unified contextualization including, for each of the at least two use cases, the respective stage and an indication of deployments at each stage of the adoption lifecycle.

According to one or more example embodiments, the plurality of assets may be deployed at a plurality of enterprise sites of the enterprise network. The method 1200 may further involve determining, for each of the at least two use cases, a number of deployments at each stage of the adoption lifecycle. The indication may be the number of deployments.

The method 1200 may further involve obtaining additional telemetry data associated with at least one other network technology. The other network technology may be deployed at a plurality of sites of the enterprise network. The method 1200 may further involve determining, for each deployment of the other network technology, a respective stage among a plurality of stages in the adoption lifecycle, based on the additional telemetry data and determining an overall progress along the adoption lifecycle of the other network technology based on the respective stage of each deployment. Additionally, the method 1200 may further include generating a cross-domain contextualization including, for each of the network technology and the at least one other network technology, the overall progress in the adoption lifecycle and an indication of deployments at each stage of the adoption lifecycle.

According to one or more example embodiments, the method 1200 may further involve determining an entitlement level of the enterprise network or a network operator for the network technology and generating support content based on the progression of the network technology along the adoption lifecycle and based on the entitlement level. The method 1200 may further involve providing the support content including a premium support resource and a usage limit of the premium support resource determined based on a prior utilization of the premium support resource by the enterprise network.

Figure 13:
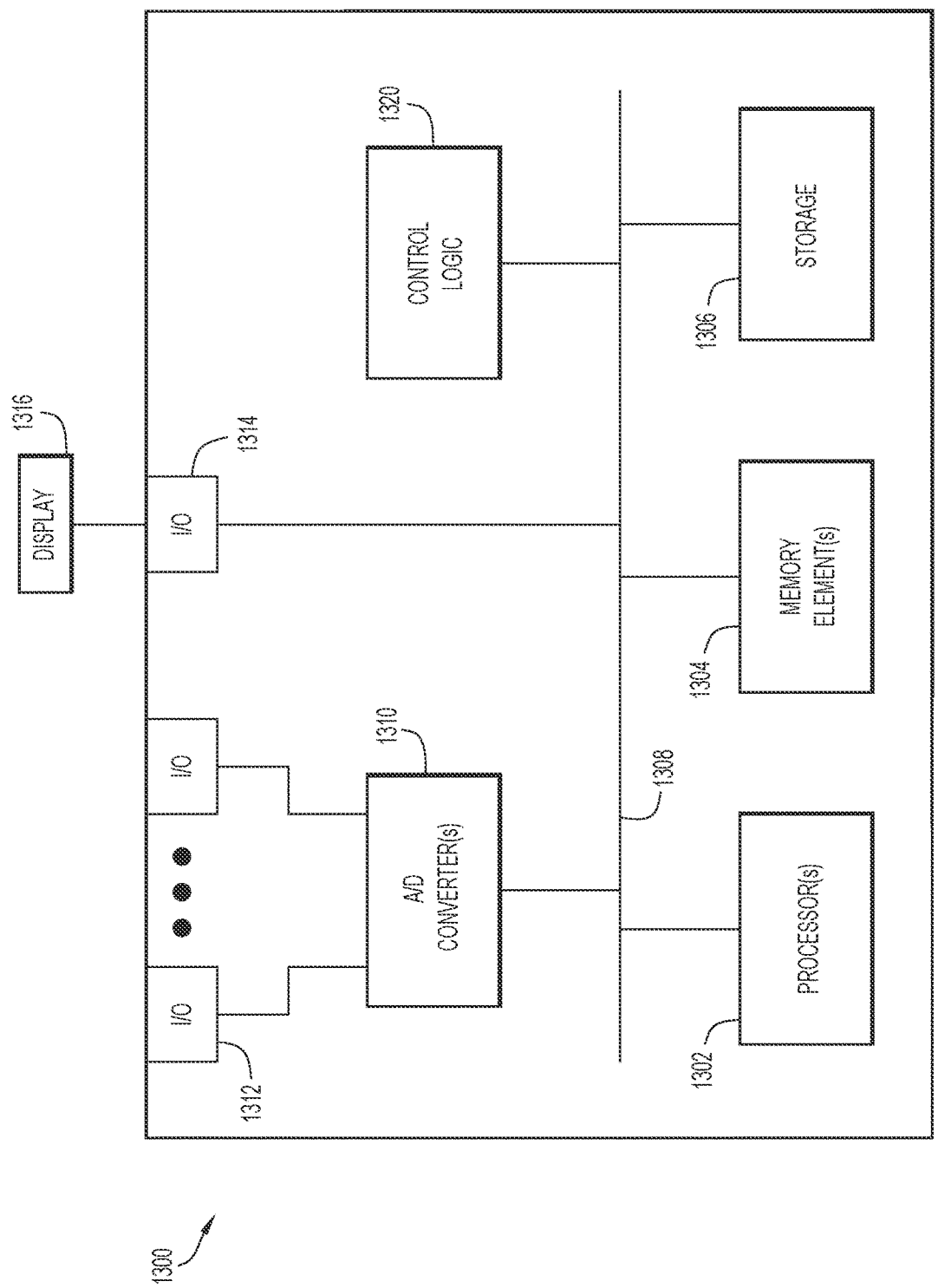
FIG. 13 is a hardware block diagram of a computing device that may perform functions associated with any combination of operations in connection with the techniques depicted and described in FIGS. 1-12.

FIG. 13 is a hardware block diagram of a computing device 1300 that may perform functions associated with any combination of operations in connection with the techniques depicted and described in FIGS. 1-12, including, but not limited to, operations of the computing device or one or more servers that execute the cloud portal 100. Further, the computing device 1300 may be representative of one of the network devices. It should be appreciated that FIG. 13 provides only an illustration of one embodiment and does not imply any limitations with regard to the environments in which different embodiments may be implemented. Many modifications to the depicted environment may be made.

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with one or more memory elements 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to the computing device 1300. For example, I/O interface(s) 1314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1316, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the computing device executing the cloud portal 100 of FIGS. 1 and 4. The apparatus includes a memory, a network interface configured to enable network communications, and a processor. The processor is configured to perform various operations. The operations include obtaining telemetry data associated with a network technology used in an enterprise network. The network technology is deployed using one or more assets of the enterprise network. The operations further include determining, for each deployment of the network technology, a progression along an adoption lifecycle of the network technology, based on the telemetry data, generating, based on the progression of each deployment of the network technology, a first action set and an alternative second action set, different from the first action set, for further progression along the adoption lifecycle, and providing the first action set and the alternative second action set for the further progression of the network technology along the adoption lifecycle.

In yet another example embodiment, one or more non-transitory computer readable storage media encoded with instructions are provided. When the media is executed by a processor, the instructions cause the processor to execute a method involving obtaining telemetry data associated with a network technology used in an enterprise network. The network technology is deployed using one or more assets of the enterprise network. The method further involves determining for each deployment of the network technology, a progression along an adoption lifecycle of the network technology, based on the telemetry data and generating, based on the progression of each deployment of the network technology, a first action set and an alternative second action set, different from the first action set, for further progression along the adoption lifecycle. The method further involves providing the first action set and the alternative second action set for the further progression of the network technology along the adoption lifecycle.

In yet another example embodiment, a system is provided that includes the devices and operations explained above with reference to FIGS. 1-13.

The programs described herein (e.g., control logic 1320) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1306 and/or memory elements(s) 1304 can store data, software, code, instructions (e.g., processor instructions), logic, parameters, combinations thereof, and/or the like used for operations described herein. This includes the storage 1306 and/or memory elements(s) 1304 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a computing device, telemetry data associated with a network technology used in an enterprise network, the network technology being deployed using one or more assets of the enterprise network;
    determining, by the computing device, for each deployment of the network technology, a progression along an adoption lifecycle of the network technology, based on the telemetry data;
    generating, by the computing device, based on the progression of each deployment of the network technology, a first action set and an alternative second action set, different from the first action set by including at least one task that is different from a plurality of tasks in the first action set, for further progression along the adoption lifecycle, wherein the at least one task relates to at least one action to change a configuration of the one or more assets of the enterprise network; and
    providing, by the computing device, the first action set and the alternative second action set for the further progression of the network technology along the adoption lifecycle.

2. The method of claim 1, further comprising:
    obtaining a selection of the first action set; and
    performing the at least one action in the first action set to change the configuration of the one or more assets, based on the selection.

3. The method of claim 2, further comprising:
obtaining additional telemetry data associated with the network technology after performing the at least one action;
determining, for each deployment of the network technology, additional progression along the adoption lifecycle, based on the additional telemetry data; and
generating insights based on the additional progression, the insights including a new or updated first action set and a new or updated alternative second action set.

4. The method of claim 1, wherein determining the progression along the adoption lifecycle includes:
determining a stage among a plurality of stages of the adoption lifecycle, the plurality of stages including at least two of an onboarding stage, an implementation stage, a use stage, an adoption stage, an engagement stage, and a maximizing use value stage.

5. The method of claim 1, wherein generating the first action set and the alternative second action set includes:
determining at least two outcomes based on analyzing the telemetry data and the progression along the adoption lifecycle;
classifying each of the at least two outcomes into a respective category selected from one or more of an adoption time category, a performance related category, a troubleshooting related category, and a support case category; and
generating the first action set for one of the at least two outcomes and the alternative second action set for another one of the at least two outcomes.

6. The method of claim 1, wherein the network technology has at least two use cases, each deployed using a plurality of assets of the enterprise network, the method further comprising:
determining, for each of the at least two use cases, a respective stage among a plurality of stages of the adoption lifecycle, based on the progression of each deployment associated with a respective use case; and
generating a unified contextualization including, for each of the at least two use cases, the respective stage and an indication of deployments at each stage of the adoption lifecycle.

7. The method of claim 6, wherein the plurality of assets are deployed at a plurality of enterprise sites of the enterprise network, and further comprising:
determining, for each of the at least two use cases, a number of deployments at each stage of the adoption lifecycle, the indication being the number of deployments.

8. The method of claim 1, further comprising:
obtaining additional telemetry data associated with at least one other network technology, the at least one other network technology being deployed at a plurality of sites of the enterprise network;
determining, for each deployment of the at least one other network technology, a respective stage among a plurality of stages in the adoption lifecycle, based on the additional telemetry data;
determining an overall progress along the adoption lifecycle of the at least one other network technology based on the respective stage of each deployment; and
generating a cross-domain contextualization including, for each of the network technology and the at least one other network technology, the overall progress in the adoption lifecycle and an indication of deployments at each stage of the adoption lifecycle.

9. The method of claim 1, further comprising:
determining an entitlement level of the enterprise network or a network operator for the network technology;
generating support content based on the progression of the network technology along the adoption lifecycle and based on the entitlement level; and
providing the support content including a premium support resource and a usage limit of the premium support resource determined based on a prior utilization of the premium support resource by the enterprise network.

10. The method of claim 1, wherein the network technology is deployed using a plurality of assets located at two or more different physical sites of the enterprise network, and further comprising:
determining, for each deployment of the network technology, a respective stage among a plurality of stages in the adoption lifecycle; and
generating a cross-domain digital representation that includes an overall progress in the adoption lifecycle of the network technology.

11. The method of claim 10, wherein the cross-domain digital representation further includes for each of the plurality of stages, an indication of a number of deployments at a respective stage from the plurality of stages, and wherein the adoption lifecycle is complete when a utilization of the network technology achieves an intended outcome of the enterprise network.

12. An apparatus comprising:
a memory;
a network interface configured to enable network communications; and
a processor, wherein the processor is configured to perform operations comprising:
obtaining telemetry data associated with a network technology used in an enterprise network, the network technology being deployed using one or more assets of the enterprise network;
determining, for each deployment of the network technology, a progression along an adoption lifecycle of the network technology, based on the telemetry data;
generating, based on the progression of each deployment of the network technology, a first action set and an alternative second action set, different from the first action set by including at least one task that is different from a plurality of tasks in the first action set, for further progression along the adoption lifecycle, wherein the at least one task relates to at least one action to change a configuration of the one or more assets of the enterprise network; and
providing the first action set and the alternative second action set for the further progression of the network technology along the adoption lifecycle.

13. The apparatus of claim 12, wherein the processor is further configured to perform:
obtaining a selection of the first action set; and
performing the at least one action in the first action set to change the configuration of the one or more assets, based on the selection.

14. The apparatus of claim 13, wherein the processor is further configured to perform:
obtaining additional telemetry data associated with the network technology after performing the at least one action;
determining, for each deployment of the network technology, additional progression along the adoption lifecycle, based on the additional telemetry data; and generating insights based on the additional progression, the insights including a new or updated first action set and a new or updated alternative second action set.

15. The apparatus of claim 12, wherein the processor is configured to perform the operation of determining the progression along the adoption lifecycle by:
  determining a stage among a plurality of stages of the adoption lifecycle, the plurality of stages including at least two of an onboarding stage, an implementation stage, a use stage, an adoption stage, an engagement stage, and a maximizing use value stage.

16. The apparatus of claim 12, wherein the processor is configured to perform the operation of generating the first action set and the alternative second action set by:
  determining at least two outcomes based on analyzing the telemetry data and the progression along the adoption lifecycle;
  classifying each of the at least two outcomes into a respective category selected from one or more of an adoption time category, a performance related category, a troubleshooting related category, and a support case category; and
  generating the first action set for one of the at least two outcomes and the alternative second action set for another one of the at least two outcomes.

17. The apparatus of claim 12, wherein the network technology has at least two use cases, each deployed using a plurality of assets of the enterprise network, the processor is further configured to perform:
  determining, for each of the at least two use cases, a respective stage among a plurality of stages of the adoption lifecycle, based on the progression of each deployment associated with a respective use case; and
  generating a unified contextualization including, for each of the at least two use cases, the respective stage and an indication of deployments at each stage of the adoption lifecycle.

18. One or more non-transitory computer readable storage media encoded with instructions that, when executed by a processor, cause the processor to execute a method comprising:
  obtaining telemetry data associated with a network technology used in an enterprise network, the network technology being deployed using one or more assets of the enterprise network;
  determining for each deployment of the network technology, a progression along an adoption lifecycle of the network technology, based on the telemetry data;
  generating, based on the progression of each deployment of the network technology, a first action set and an alternative second action set, different from the first action set by including at least one task that is different from a plurality of tasks in the first action set, for further progression along the adoption lifecycle, wherein the at least one task relates to at least one action to change a configuration of the one or more assets of the enterprise network; and
  providing the first action set and the alternative second action set for the further progression of the network technology along the adoption lifecycle.

19. The one or more non-transitory computer readable storage media of claim 18, wherein the method further comprises:
  obtaining a selection of the first action set; and
  performing the at least one action in the first action set to change the configuration of the one or more assets, based on the selection.

20. The one or more non-transitory computer readable storage media of claim 19, wherein the method further comprises:
  obtaining additional telemetry data associated with the network technology after performing the at least one action;
  determining, for each deployment of the network technology, additional progression along the adoption lifecycle, based on the additional telemetry data; and
  generating insights based on the additional progression, the insights including a new or updated first action set and a new or updated alternative second action set.

* * * * *